US010219112B1

(12) United States Patent
Mishra

(10) Patent No.: US 10,219,112 B1
(45) Date of Patent: *Feb. 26, 2019

(54) DETERMINING DELIVERY AREAS FOR AERIAL VEHICLES

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,972

(22) Filed: Aug. 16, 2017

Related U.S. Application Data

(63) Continuation of application No. 14/871,080, filed on Sep. 30, 2015, now Pat. No. 9,743,239.

(51) Int. Cl.
*H04W 4/00* (2018.01)
*H04W 4/02* (2018.01)
*G06Q 10/08* (2012.01)
*H04W 4/021* (2018.01)

(52) U.S. Cl.
CPC .......... *H04W 4/023* (2013.01); *G06Q 10/083* (2013.01); *H04W 4/021* (2013.01)

(58) Field of Classification Search
CPC ..... H04W 4/023; H04W 4/021; G06Q 10/083
See application file for complete search history.

(56) References Cited

U.S. PATENT DOCUMENTS

| 8,015,023 B1 | 9/2011 | Lee et al. |
| 9,896,204 B1 * | 2/2018 | Willison ............... B64C 39/024 |
| 2011/0112761 A1 * | 5/2011 | Hurley ................... G01C 21/32 |
| | | 701/465 |
| 2013/0324164 A1 | 12/2013 | Vulcano |
| 2015/0254611 A1 * | 9/2015 | Perez ............... G06Q 10/08355 |
| | | 705/5 |
| 2016/0019495 A1 * | 1/2016 | Kolchin ............. G06Q 10/0833 |
| | | 705/333 |
| 2016/0104113 A1 | 4/2016 | Gorlin |

(Continued)

OTHER PUBLICATIONS

Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, 14 pages.

*Primary Examiner* — Khai M Nguyen
(74) *Attorney, Agent, or Firm* — Athorus, PLLC

(57) ABSTRACT

Preferred points or regions in space for performing a task at a location, e.g., the delivery of an item to the location, may be defined based on sensed positions obtained during the prior performance of tasks at the location. The sensed positions may be identified using a GPS sensor or like system. Vectors including coordinates of the sensed position, and uncertainties of such coordinates, may be clustered into groups at the location. Subsequently identified vectors including coordinates and uncertainties may further refine a cluster, or be used to generate a new cluster. A preferred point or region in space may be identified based on such location hypotheses and utilized in the performance of tasks. Some preferred points or regions may be used for routing vehicles to the location, while others may correspond to delivery points for items at the location.

20 Claims, 21 Drawing Sheets

(56) References Cited

U.S. PATENT DOCUMENTS

| | | | |
|---|---|---|---|
| 2016/0239789 A1* | 8/2016 | Hanks | G06Q 10/083 |
| 2016/0258775 A1* | 9/2016 | Santilli | G01C 21/36 |
| 2016/0364660 A1 | 12/2016 | Brown | |
| 2016/0364823 A1 | 12/2016 | Cao | |
| 2017/0154347 A1* | 6/2017 | Bateman | G06Q 30/0202 |
| 2017/0193442 A1* | 7/2017 | Ekkel | G06Q 10/0832 |

* cited by examiner

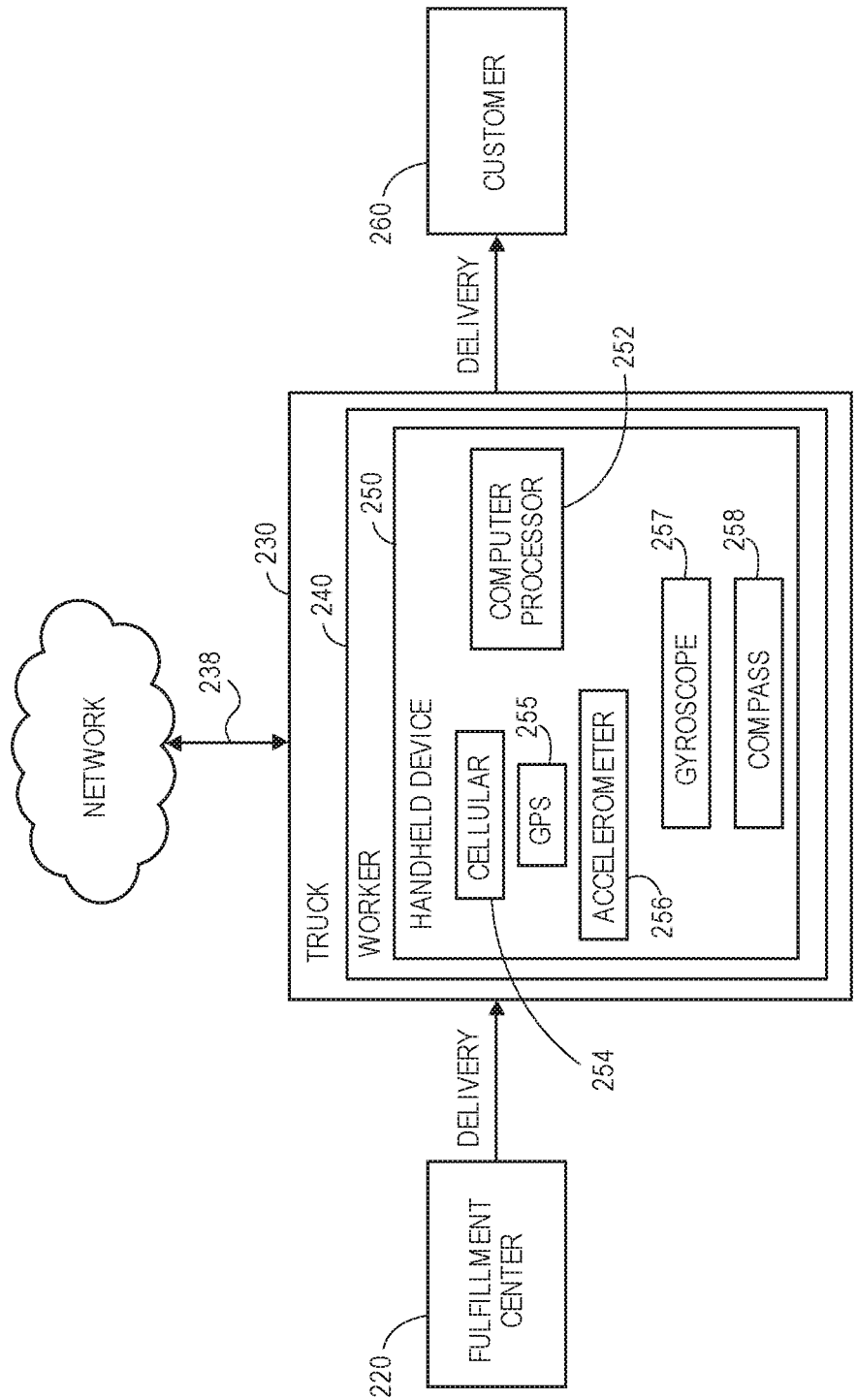

DETERMINING DELIVERY AREAS FOR AERIAL VEHICLES

CROSS-REFERENCE TO RELATED APPLICATIONS

This application is a continuation of U.S. patent application Ser. No. 14/871,080, now U.S. Pat. No. 9,743,239, filed Sep. 30, 2015, the contents of which are incorporated herein by reference in their entirety.

BACKGROUND

Geocoding is a process by which alphanumeric descriptions of locations (e.g., street addresses) are converted into coordinates of one or more points in space, or "geolocations," that are associated with such locations. Common geocoders for generating maps of locations, or routes or directions based on such maps, include software applications or hardware components that may generate one or more spatial geocodes from descriptions of locations or references to such locations, using one or more text evaluation procedures, probabilistic algorithms or geospatial data sources.

For example, when a street address is entered into a text box or otherwise provided to a mapping application (e.g., a web-based application accessed via a browser, or a dedicated application operating on one or more portable computer devices), a destination corresponding to the street address is identified, and one or more routes from a predetermined origin (e.g., a location of a computer device from which the street address was entered or provided, or any other relevant location) to the destination may be determined. An optimal or recommended route from the origin to the destination may be identified and selected according to any path-planning principles or criteria.

Although geocoding processes may accurately convert text-based or numeric descriptions of locations to coordinates, such processes do not consider physical attributes of the locations, or conditions at the locations, when identifying coordinates of the locations and returning such locations to a user. For example, when a common carrier intends to deliver a parcel to a customer located in a building, the common carrier may use a geocoder or geocoding application to determine both a location of the building, and a driving route to the location, based on a street address of the building on a handheld device such as a smartphone, or a computer device provided in a delivery vehicle. Such techniques may not, however, identify an appropriate parking area for the delivery vehicle at the location, or furnish any additional information regarding a specific point at the location where the parcel should be delivered by hand, or determine a walking route between the parking area and the specific point. Such techniques also may not determine whether the parking area, the specific point or the walking route may vary based on temporal, weather, seasonal, legal or regulatory considerations, or special events that may be scheduled or occurring within a vicinity of the building. Such techniques also fail to consider any prior histories in traveling to the location, or general or specific preferences of individuals or entities in the location, when determining coordinates of the location.

BRIEF DESCRIPTION OF THE DRAWINGS

FIGS. 2A and 2B are block diagrams of components of one system for determining routing points or delivery points in accordance with embodiments of the present disclosure.

DETAILED DESCRIPTION

Figure 1A:
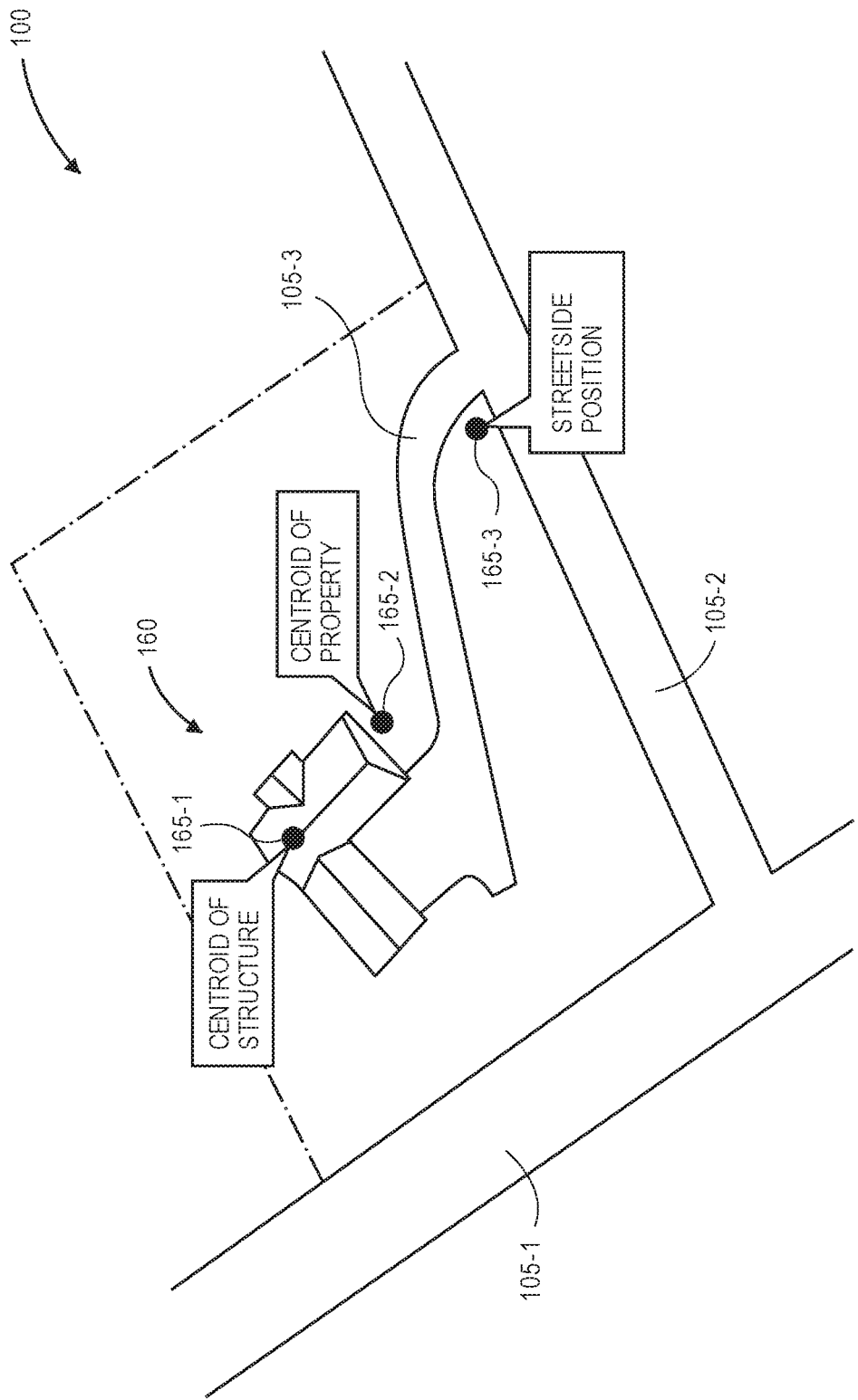
FIGS. 1A through 1E are views of aspects of one system for determining routing points or delivery points in accordance with embodiments of the present disclosure.

As is set forth in greater detail below, the present disclosure is directed to determining routing points or delivery points that are associated with a location. More specifically, the systems and methods disclosed herein are directed to identifying points or regions in space that are determined to be associated with, optimal or preferred for travel to a given location for any purpose, e.g., the performance of any task, including but not limited to a delivery of an item to the given location. The points or regions in space may include one or more routing points or regions, e.g., points or regions at which a person, a vehicle or another machine may be appropriately routed when attending the location, or delivery points or regions, e.g., points or regions at which an item may be appropriately deposited when the person, the vehicle, or the other machine attends the location.

Such points or regions in space may be determined based on one or more sensed positions of computer devices associated with persons, vehicles or machines attending the location in accordance with the present disclosure. In some embodiments, the sensed positions may be determined upon a delivery of an item to the location, such as when a bar code or other marked identifier provided on an outer surface of the item is scanned or otherwise interpreted at or near the location, or by other position sensing techniques. The sensed positions of such devices may be clustered or grouped into hypotheses or areas of uncertainty based at least in part on accuracies or tolerances of the sensors that determined such positions or any other extrinsic factors including but not limited to actions or behaviors of the persons, vehicles or machines, or environmental or operational conditions within a vicinity of the location. Such hypotheses may be used to select or more specific points or regions in space associated with the location, e.g., a routing point or a delivery point for the location, or with any task to be performed at the location based on the hypotheses and on any other relevant factor regarding the location, the task, or any persons, vehicles or machines associated with the location or the task.

Once another sensed position is subsequently determined, the sensed position may be evaluated to determine whether the sensed position is relevant to the location, to the task, or to any persons, vehicles or machines associated with the location or the task. If the sensed position is deemed relevant, the sensed position and any uncertainties associated therewith may be compared to any previously determined location hypotheses, in order to determine whether the sensed position corresponds to one of the hypotheses, and would reduce any levels (or measures) of errors or uncertainties associated with the hypothesis with which the sensed position corresponds. If the sensed position and its errors or uncertainties would reduce the levels of the errors or uncertainties associated with that hypothesis, then the sensed position may be assigned to that hypothesis, and the coordinates, descriptors or other models of that hypothesis may be updated accordingly. If the sensed position would not reduce any of the levels of the errors or the uncertainties associated with that hypothesis, however, then a new location hypothesis may be defined based on the sensed position and its uncertainties.

The points or regions in space identified as associated with a given location in accordance with the systems and methods of the present disclosure may, therefore, differ from points or regions generally identified for the given location according to traditional geocoding techniques, in that the systems or methods disclosed herein may take into account historical information regarding the performance of a task at the given location, e.g., points previously attended when performing the same tasks, or other tasks, at the given location, as well as any temporal, weather, seasonal, legal or regulatory considerations that may be relevant to the performance of the task.

Referring to FIGS. 1A through 1E, views of aspects of one system 100 for determining routing points or delivery points in accordance with embodiments of the present disclosure are shown. The system 100 includes a location 160, e.g., a property having a structure thereon, bounded by streets 105-1, 105-2, and a driveway 105-3 leading from the street 105-2 to the structure. A number of geographic attributes of the location 160 are shown in FIG. 1A, including a centroid 165-1 of the structure at the location 160, a centroid 165-2 of the property at the location 160, and a streetside position 165-3 associated with the location 160, e.g., adjacent to the street 105-2.

As is discussed above, the systems and methods of the present disclosure are directed to improving upon geocoding techniques which are typically configured to identify average, general or nominal points or regions in space based upon a description of a location. For example, upon receiving an alphanumeric description (e.g., a number, a street, a municipality, a state and/or a Zoning Improvement Plan code, or ZIP code) of the location 160, a geocoder will typically identify coordinates corresponding to one or more of the centroid 165-1 of the structure, the centroid 165-2 of the property or the streetside position 165-3 as associated with the location 160. While the coordinates of the centroid 165-1 of the structure, the centroid 165-2 of the property or the streetside position 165-3 may be suitable for some purposes, or on some occasions, such coordinates only generally describe the location 160 and do not refer to any geographic features or constraints in any level of detail, e.g., any surface features corresponding to topographical elements at the location. Standing alone, such coordinates fail to reflect any extrinsic considerations such as weather or events currently underway at the location 160, or any intrinsic considerations such as any preferences of one or more individuals at the location 160, or past experiences with such individuals.

Figure 1B:
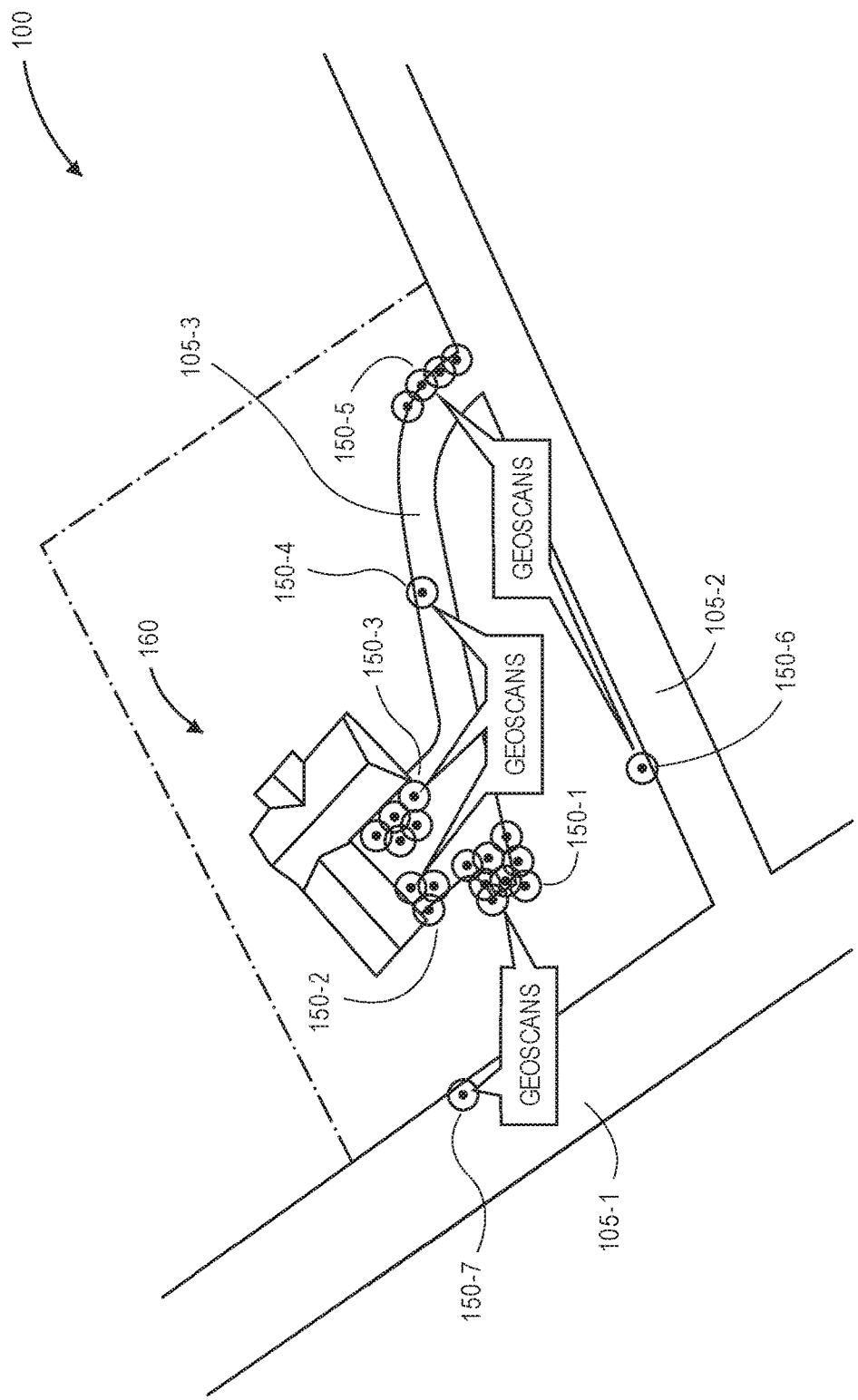

Referring to FIG. 1B, the system 100 is shown with a plurality of groups of geoscans, e.g., statistical models of points at which actual positions of a person, a vehicle or another machine at the location were determined during the performance of one or more tasks based on Global Positioning System (or "GPS") signals or other positioning techniques, and any levels of uncertainty associated with the signals or techniques. For example, as is shown in FIG. 1B, a group 150-1 of the geoscans is shown in a turnaround area of a driveway 105-3 leading to the structure at the location 160, while groups 150-2, 150-3 of the geoscans are shown adjacent to the structure. A group 150-4 consisting of a single geoscan is shown along the driveway, while a group 150-5 of multiple geoscans is shown at an end of the driveway near the street 105-2. Groups 150-6, 150-7 each consisting of a single geoscan are shown along each of the streets 105-1, 105-2.

In accordance with the present disclosure, information regarding actual positions identified in association with a location, such as the groups 150-1, 150-2, 150-3, 150-4, 150-5, 150-6, 150-7 of geoscans shown in FIG. 1B, may be used to determine points or regions in space that may be associated with, optimal or preferred for subsequent travel to the given location. For example, a location hypothesis, e.g., an area of uncertainty, may be defined initially based on an output of a geocoder or a point traditionally associated with a location, e.g., the centroid 165-1 of the structure, the centroid 165-2 of the property or the streetside position 165-3 of FIG. 1A, and subsequently based on regions or sectors at or near a location that were attended during the performance of one or more tasks associated with the location, which may be determined based on the number, prevalence or frequency of geoscans within such regions or sectors. Points or regions in space for performing a task at the location, e.g., the delivery of an item to the location, may be determined from the location hypotheses defined from such regions or sectors. For example, a routing point for a vehicle at a location may be determined based on GPS positions of vehicles that were used during the performance of tasks at the location, or based on positions that were manually or automatically determined by a person, a vehicle or a machine at the location during the performance of such tasks.

The points or regions may be defined based on any relevant information or data regarding a task, a location or a person, a vehicle or a machine associated with the task or the location. The points or regions may be associated with specific elements of a task on any basis, including by relation to information that is known regarding physical constraints in an area of the location (e.g., buildings, passageways, easements, walls or other aspects of the area). Such points or regions may be ranked in an order or priority, which may be determined in general, or specifically with regard to one or more specific factors. For example, a ranking of points or regions may be defined based on times of day, days of a week, or months or seasons of a year, as well as weather conditions at the location, or any legal or regulatory concerns or requirements at the location. A ranking of the points or regions may also be defined based on attributes of a given task, e.g., with a first set of rankings relating to tasks involving large or heavy items, widespread activity or extended durations, or a second set of rankings relating to tasks involving small or lightweight items, minimal activity or brief durations. A ranking of the points or regions may be further defined based on attributes of a person, a vehicle or a machine associated with a given task, or on any other relevant factor.

Figure 1C:
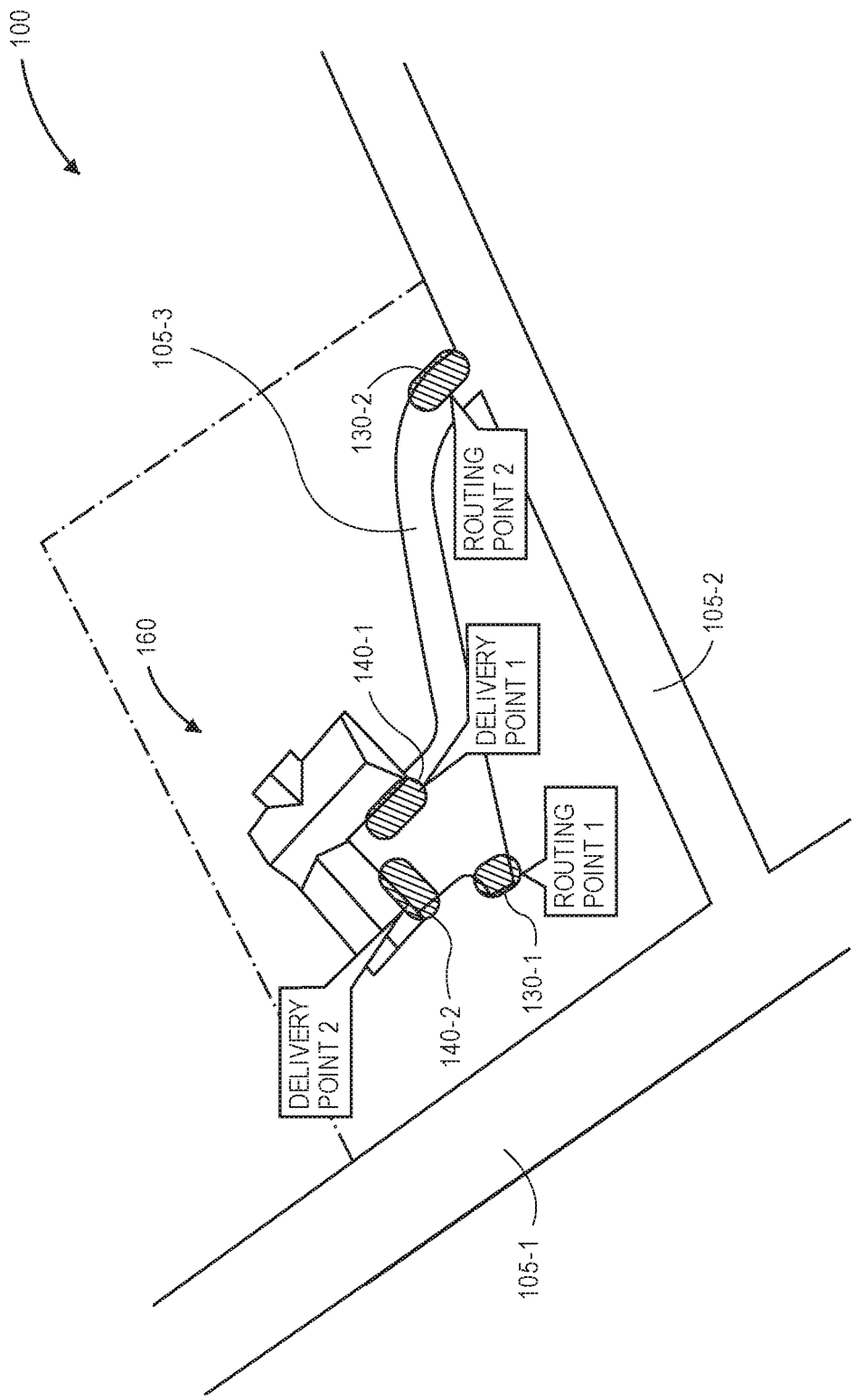

Referring to FIG. 1C, the system 100 is shown with a pair of routing points 130-1, 130-2 and a pair of delivery points 140-1, 140-2. As is shown in FIG. 1C, the routing point 130-1 corresponds to the group 150-1 of geocodes shown in FIG. 1B, and is located in the turnaround area of the driveway leading to the structure at the location 160, while the routing point 130-2 corresponds to the group 150-5 of geocodes shown in FIG. 1B, and is located at a terminus of the driveway near the street 105-2. The delivery point 140-1 is located adjacent to a first wall of the structure, which may be near a front door of the structure, and corresponds to the group 150-3 of geocodes shown in FIG. 1B, while the delivery point 140-2 is located adjacent to a second wall of the structure, which may be near one or more garage doors of the structure, and corresponds to the group 150-2 of the geocodes shown in FIG. 1B. The routing points 130-1, 130-2 may be defined as intermediate points associated with a given task, e.g., between an origin and a destination, or points where a mode of transit can, should or must change, such as where a person must dismount from a vehicle and proceed further on foot. The delivery points 140-1, 140-2 may be defined as final points associated with a given task, e.g., at the destination, or points where the task must be finally performed.

Moreover, the routing points 130-1, 130-2 and the delivery points 140-1, 140-2 may be continually refined as further geoscans are received in association with the location 160. Where a subsequent task is to be performed at the location 160, and a geoscan is received from a person, a vehicle or a machine associated with the task or the location 160, the geoscan may be compared to information or data regarding the location, e.g., ZIP codes, street names, locations, property data, street attributes, lot descriptions, building footprints or other spatial entities or references associated with the location, in order to validate the geoscan as consistent with the location or the task. Once the geoscan has been validated, the geoscan may be compared to the routing points 130-1, 130-2 and the delivery points 140-1, 140-2, to determine whether the geoscan corresponds to one of the routing points 130-1, 130-2 or the delivery points 140-1, 140-2, and whether the geoscan would reduce the uncertainties associated therewith, or whether a new location hypothesis may be defined based on the geoscan.

In accordance with the present disclosure, information regarding actual points in space previously attended by persons, vehicles or machines during the performance of a task at a location may be used to define points or regions in space to be attended by persons, vehicles or machines during the performance of future tasks. Thus, referring again to FIGS. 1A through 1C, the routing points 130-1, 130-2 and the delivery points 140-1, 140-2 of FIG. 1C may be defined based at least in part on the groups 150-1, 150-2, 150-3, 150-4, 150-5, 150-6, 150-7 of geoscans of FIG. 1B and any relevant metadata (e.g., times or dates of such geoscans; a person, a vehicle or a machine associated with such geoscans; or a task being performed thereby). The routing points 130-1, 130-2 and the delivery points 140-1, 140-2 are better suited for a given task than points identified according to traditional geocoding techniques, such as the centroid 165-1 of the structure, the centroid 165-2 of the property or the streetside position 165-3 of FIG. 1A, and may be specifically relevant to the task, or to a particular person, vehicle or machine associated with the task. For example, when an item is to be delivered to the location 160 by a person or a vehicle, or using a machine, one of the routing points 130-1, 130-2 and one of the delivery points 140-1, 140-2 may be selected on any basis, and the person or the vehicle may be instructed to travel to the selected one of the routing points 130-1, 130-2, and the selected one of the delivery points 140-1, 140-2, when delivering the item to the location 160.

Figure 1D:
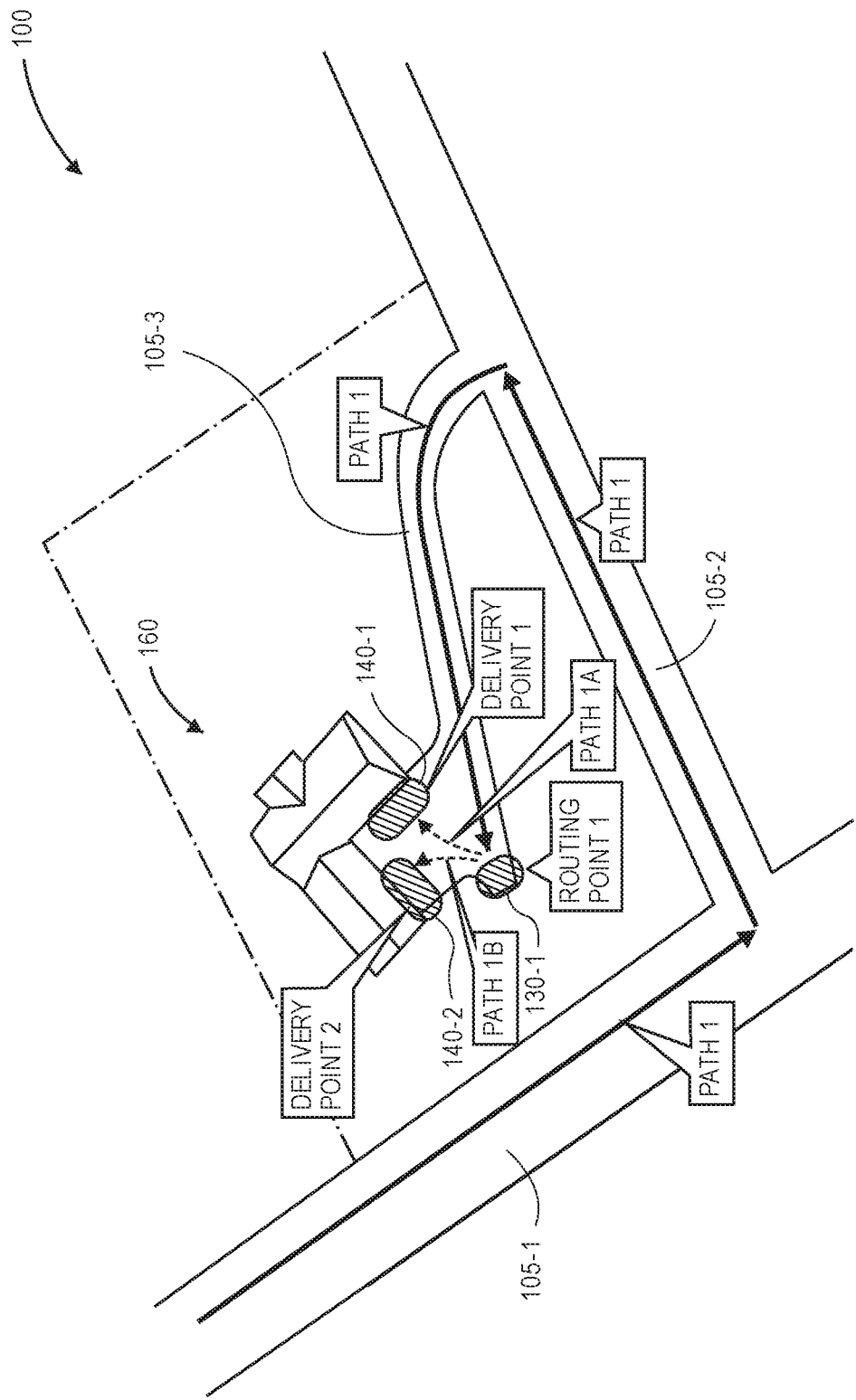
Figure 1E:
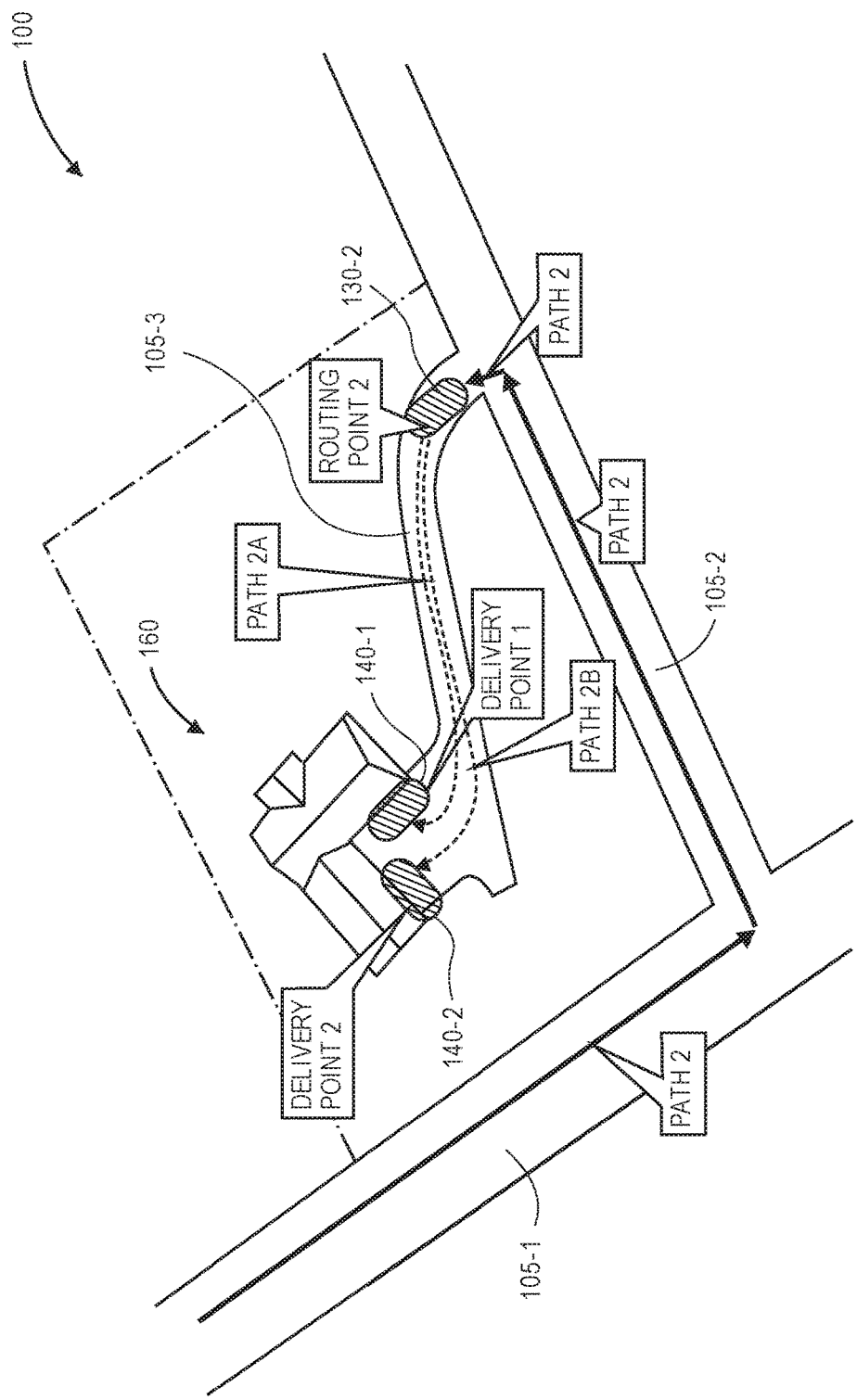

Furthermore, once the routing points 130-1, 130-2 and the delivery points 140-1, 140-2, have been defined, a path associated with the performance of the task at the location 160 may be determined. Referring to FIG. 1D, where an item is to be delivered to the location 160, and the routing point 130-1, e.g., the turnaround area of the driveway 105-3 leading to the structure at the location 160, is determined to be preferred for the delivery of the item to the location 160, on any basis, a path from an origin of the item to the routing point 130-1 may be provided to a handheld computer device or other machine, and a worker may be instructed to drive a vehicle to the routing point 130-1. The worker may be further instructed to walk from the vehicle at the routing point 130-1 to one of the delivery points 140-1, 140-2, and to deposit the item there. Conversely, referring to FIG. 1E, where the routing point 130-2, e.g., an area near an intersection of the driveway 105-3 with the street 105-2, is determined to be preferred for the delivery of the item to the location 160, a path from the origin of the item to the routing point 130-2 may be provided to the handheld device or other machine, and the worker may be further instructed to walk from the vehicle at the routing point 130-2 to one of the delivery points 140-1, 140-2, and to deposit the item there.

The term "geolocation" refers to a geospatially-referenced point that precisely defines an exact location in space with one or more geocodes, such as a set of geographic coordinates. The term geolocation (or geolocating) may also refer to acts or processes for determining such points or locations in space. Typically, a geolocation is referenced with a pair of coordinates, viz., a latitude and longitude, that may be ascertained from geographic information system (or "GIS") data, from information received via the GPS system, e.g., data received from one or more orbiting satellites, from information obtained using cellular telephone equipment configured to estimate (e.g., triangulate) a position from one or more cellular telephone network towers or other network sources, or from information determined by any other source.

For example, geolocations are commonly determining by geocoding, e.g., processes by which information describing or referencing a location is converted into one or more geocodes or other geographic coordinates of the location. Geocoders (e.g., software applications and/or hardware components configured to perform geocoding techniques) may perform a set of character-based operations or numerical or probabilistic algorithms based on street addresses or other information describing or referencing a geolocation, and access any available geospatial data sources, in order to identify a spatial geocode or set of geocodes corresponding to the location.

A geocode may refer to a geolocation at any level of scale or precision. For example, a geocode may identify a location corresponding to a street address with an exact streetside point, or with an interpolated point for a structure, a lot or another real estate property located at the street address. A geocode may also refer to a centroid of a structure (e.g., a rooftop) or a lot, or a centroid or other point within any type of geographic regions such as neighborhoods, municipalities, counties, states, nations or continents, as well as formally defined spaces corresponding to ZIP codes (e.g., standard five-digit ZIP codes or nine-digit ZIP+4 codes), telephone prefixes or telephone area codes, informally defined spaces such as parks, ranges, stadiums, arenas, venues, waterways or other areas, or any other type or kind of geographic region.

The use of accurately defined geolocations is essential to the proper delivery or performance of many products or services, including but not limited to the performance of emergency services (e.g., fire, police or medical assistance) or postal services (e.g., via the United States Postal Service or one or more common carriers), or the delivery of any type or form of item (e.g., food, merchandise or other products). Where a service is to be performed at a location, or a product is to be delivered to the location, the most essential geolocation required is an identifier of the location at which the product is to be delivered or the service is to be performed. For example, when a street address for a location (e.g., "221 Trumbull Street, Hartford, Conn. 06103") or a name or other descriptor of the location (e.g., "Rentschler Field") is provided to a geocoder in any manner, such as by a keyboard, a keypad, a touchscreen or a stylus, a geocode corresponding to a geolocation at the location may be received from the geocoder. The geocode may then be provided to a person, a vehicle or a machine associated with the task, and a path from an origin to the geolocation may be determined.

While geocodes are helpful in generally directing a person, a vehicle or a machine to a location for the delivery of products or the performance of services, geocodes do not identify any relevant information regarding architectural or topographical features at the location, or a specific point or region at the location where the delivery of the product or the performance of the services is desired. By themselves, geocodes lack any specific details regarding procedures, protocols or requirements that are to be observed at a location, and are utterly silent as to any historical background or lessons that may have been learned by persons, vehicles or machines that previously attended the location.

The systems and methods of the present disclosure are directed to determining preferred points or regions at a given location, such as routing points and/or delivery points, for the performance of a given task. In some embodiments, routing points and/or delivery points may be defined based at least in part on geolocation estimation techniques which determine probability distributions, e.g., according to a Gaussian location hypothesis or other methods or techniques for modeling errors or uncertainty, of sensed positions at a location and any levels of uncertainty associated with the distributions, and group the sensed positions into one or more hypothetical location clusters, e.g., location hypotheses or areas of uncertainty. For example, when a position associated with a delivery of an item to a given location is determined, e.g., when a bar code or other marked identifier provided on the item to be delivered is scanned or otherwise optically recognized, and a position at which the bar code or other marked identifier was scanned or recognized is determined, the position and any associated information, data or metadata regarding sensor noise or a level of uncertainty of the position may be represented in a geoscan $G_1(t)$, e.g., a vector or other set of variables defining a probability distribution that includes coordinates of the position and the sensor noise or the level of uncertainty of the position, such as a standard deviation, at a time t. A location hypothesis $H_1(t)$ may be defined for a given location based on the geoscan $G_1(t)$, or on one or more traditional geolocations, e.g., outputs of a geocoder or geocoding system. The geoscan $G_1(t)$ and the location hypothesis $H_1(t)$ may be modeled according to any methods or techniques for indicating errors or uncertainties, including but not limited to a Gaussian distribution.

According to some other embodiments of the present disclosure, when another geoscan $G_2(t+1)$ is received at a time t+1 at the given location, the geoscan $G_2(t+1)$ may be compared to the location hypothesis $H_1(t)$ and any other location hypotheses in order to determine whether the geoscan $G_2(t+1)$ matches or otherwise corresponds to the location hypothesis $H_1(t)$. If the geoscan $G_2(t+1)$ matches or corresponds to the location hypothesis $H_1(t)$, and would reduce the error or uncertainty associated with the location hypothesis $H_1(t)$, then covariance matrices may be generated based on the geoscan $G_2(t+1)$ and the location hypothesis $H_1(t)$, and the covariance matrices may be multiplied to account for the specific location of the other geoscan $G_2(t+1)$, or any noise or level of uncertainty of a sensor that captured the geoscan $G_2(t+1)$. Based on the products of the covariance matrices, new distribution parameters for the location hypothesis $H_1(t)$ at time t+1 may be extracted, and the new distribution parameters may be used to update the location hypothesis $H_1(t)$ to $H_1(t+1)$. If the geoscan $G_2(t+1)$ neither matches nor corresponds to the location hypothesis $H_1(t)$, then a new location hypothesis $H_2(t+1)$ may be defined based on the geoscan $G_2(t+1)$ for the given location.

Accordingly, the systems and methods of the present disclosure may define points or regions in space based on geoscans in an unsupervised manner that continuously refines the definitions of such points or regions in space based on subsequently determined geoscans and ensures that such points or regions in space, e.g., routing points or delivery points, are most appropriate or best-suited for the performance of any type or form of task at a given location. When a geoscan is received, the geoscan may be coarsely filtered by or validated against information regarding the given location or a task to be performed there. If the geoscan is determined to be valid, the geoscan may be compared against any known points or regions in space, e.g., routing points or delivery points, in order to determine whether updating one of the points or regions in space to include the geoscan would reduce a level of uncertainty associated with the point or region so updated. If the geoscan would not reduce the level of uncertainty associated with any of the points or regions in space, however, then a new point or region in space, e.g., a new routing point or delivery point, may be defined accordingly.

The systems and methods of the present disclosure may further enhance the identification of points or regions in space where tasks are to be performed in situations in which a geolocation obtained through traditional geocoding means is unhelpful or has limited value. For example, where an item is to be delivered to a building having a predefined street address, knowing a centroid of a rooftop of the building, a centroid of a property where the building is located, or a mere streetside position, only assists a delivery associate to a limited extent. The systems and methods of the present disclosure may, based on historical information regarding the performance of tasks at a location, e.g., deliveries of items to the location, and any attributes that may be known regarding the tasks, the locations, or one or more persons, vehicles or machines associated with the tasks, identify discrete points or regions in space associated with the location where such tasks are most appropriately performed.

After a plurality of points or regions in space have been defined in connection with a given location, e.g., based on a number, prevalence or frequency of geoscans within such points or regions, the points or regions may be evaluated to determine whether such points or regions correspond to a routing point, a delivery point, or a point having any other relevance or purpose. Whether a point or region in space constitutes a routing point, a delivery point, or any other type of point may be determined on any basis, including any relevant information regarding architectural or topographical features at the location, including but not limited to any structures or portions thereof, stairs, ramps, curbs, hills, roads, driveways, walkways or surfaces having any degree of incline or slope, or any temporal, weather, seasonal, legal or regulatory considerations.

Thus, where an item is to be delivered to a given location specified by the customer, a point or region to which a delivery vehicle such as a truck, a van or an unmanned aerial vehicle (or drone) should preferably travel when delivering items to the given location, viz., a routing point, may be identified. The routing point may include or comprise a driveway, or a specific portion of a driveway, as well as a particular parking facility (e.g., a parking garage, lot or space) any area where a customer or recipient prefers that vehicles arrive or park, or any other area to which vehicles have successfully arrived and from which such vehicles have successfully departed. Likewise, a preferred point or region where items are preferably deposited at the given location, viz., a delivery point, may also be identified. The delivery point may be or comprise a mailbox or other post box, a porch, a door, a garage, a windowsill or any other location where a customer prefers that items be deposited, or any other area where deliveries to the given location have been successfully effectuated. For example, unlike traditional geocoders, which return geocodes that only generally refer to a lot or a structure, the systems and methods of the present disclosure may be used to automatically determine that a preferred location for a vehicle to travel to an office building, e.g., a routing point for that office building, is behind the building and not in front of it, or that a preferred location for an item to be delivered to a customer, e.g., a delivery point for the customer or an address designated by the customer, is on his or her back porch and not his or her garage or front door.

Once a point or region at which a task is to be performed at a location is identified, e.g., a single point associated with the location, or two or more points or regions associated with the location, such as a routing point and a delivery point, an optimal path or an optimal route to the point or region, or to or extending between such points or regions, may be determined. An optimal path, e.g., a "shortest path," may be calculated by one or more known algorithms, formulas or means, including those previously associated with transportation between points, vertices or nodes. For example, the systems and methods of the present disclosure may define such optimal paths using one or more iterations of common mathematical principles for solving shortest path problems, including but not limited to Dijkstra's Algorithm, Bellman-Ford Algorithm, Floyd-Warshall Algorithm, Johnson's Algorithm or hub labeling. Additionally, such algorithms, formulas or means may also use any amount of geospatial information, such as identifications of the locations of an origin of a product or a service and the location where the product is to be delivered or the service is to be performed, which may expressed in a two-dimensional Cartesian format, e.g., $(x_i, y_i)$, or latitudes and longitudes of the origin and the location, or in a three-dimensional format, e.g., $(x_i, y_i, z_i)$ or latitudes, longitudes and altitudes of the origin and the location.

In accordance with the present disclosure, a list or set of points or regions at a location, e.g., routing points or delivery points, may be ranked in terms of their priority or suitability for a given task to be performed at the location. Such a ranking may take into account any attributes of the task, such as a size, shape, weight or volume of an item to be delivered, or a capacity of a worker or a vehicle delivering the item, as well as any temporal, weather, seasonal, legal or regulatory considerations that may be pertinent. Thus, given a set of points or regions for performing a task at a location, the points or regions of the set may be ranked differently depending on specific attributes of the task or the location. For example, a first routing point may be optimal in harsh weather conditions, on Tuesdays, or during rush hour, while a second routing point may be optimal in mild weather conditions, on weekends or when traffic is light. Likewise, a first delivery point may be preferred when a location is covered with snow or at night, while a second delivery point may be preferred when the location is dry or during daylight hours.

The systems and methods of the present disclosure may be utilized in connection with any type or form of "last-mile" considerations. For example, one or more delivery points may be automatically determined for a customer of a private transportation service in accordance with the present disclosure. The customer may prefer to be picked up or dropped off at locations other than his or her residence, for security concerns, or at different locations depending on the weather, the time of day, or any other relevant factor. Likewise, one or more delivery points may be identified for pedestrians within large, undefined spaces. For example, where a passenger intends to depart from a particular airport on a given flight managed by a specific airline, the systems and methods of the present disclosure may identify a routing point such as a parking facility or a delivery point such as a security gate that are most appropriate for passengers on the given flight or the specific airline, at the particular airport, based on check-ins of prior passengers who traveled on the same flight or with the same airline. Different routing points and delivery points may be identified if the passenger departs on other flights managed by different airlines. By contrast, traditional geocoding processes may only identify a location of the airport, and are unhelpful in traveling within the location or at the airport.

Moreover, points or regions in space identified for a particular location or a specific task, or for a person, a vehicle or a machine attending to the particular location or performing the specific task, may be utilized in connection with other locations or tasks, or other persons, vehicles or machines. For example, in some embodiments, a routing point or a delivery point identified for an apartment building may be utilized in connection with deliveries of any items, from food to furniture, to one or more tenants of the apartment building. In some other embodiments, the use of routing points or delivery points may be restricted based on attributes or characteristics of a given task to be performed at a location, or a person, a vehicle or a machine charged with performing the task. For example, in some embodiments, a first routing point or a first delivery point at an office building may be preferred for use in connection with deliveries of food but not furniture, or with deliveries of small items but not large items, or for deliveries by persons and not vehicles, while a second routing point or a second delivery point at the office building may be preferred for use in connection with deliveries of furniture but not food, or with deliveries of large items but not small items, or for deliveries by vehicles and not persons. Any attribute or characteristic of a location, a task to be performed at the location, or a person, a vehicle or a machine associated with the location or the task may be considered when identifying one or more points or regions in space in accordance with the present disclosure.

Figure 2A:
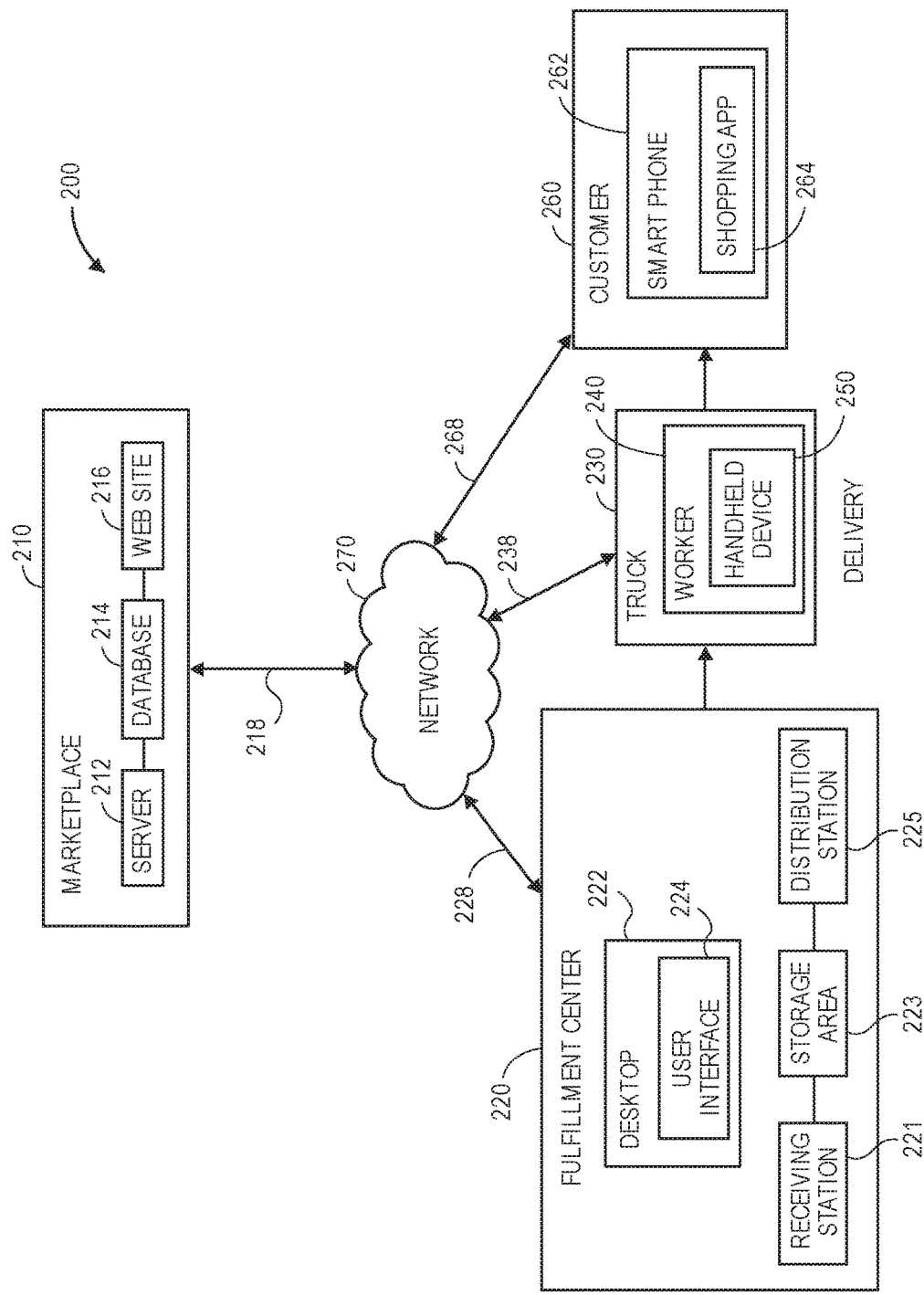

As is discussed above, some embodiments of the present disclosure may be utilized to identify points or regions in space, e.g., routing points or delivery points, that are most appropriate for delivering an item to a given location. Referring to FIGS. 2A and 2B, a block diagram of one system 200 for determining routing points or delivery points is shown. As is shown in FIG. 2A, the system 200 includes a marketplace 210, a fulfillment center 220, a truck 230 including a worker 240 having a handheld device 250 and a customer 260 that are connected to one another across a network 270, such as the Internet. Except where otherwise noted, reference numerals preceded by the number "2" in FIG. 2A or FIG. 2B refer to elements that are similar to elements having reference numerals preceded by the number "1" shown in FIGS. 1A through 1E.

The marketplace 210 may be any entity or individual that wishes to make items from a variety of sources (e.g., vendors, manufacturers, merchants or sellers) available for download, purchase, rent, lease or borrowing by customers using a networked computer infrastructure, including one or more physical computer servers 212 and databases 214 (or data stores) for hosting a web site 216. The marketplace 210 may be physically or virtually associated with one or more storage or distribution facilities, such as the fulfillment center 220. The web site 216 may be implemented using the one or more servers 212, which connect or otherwise communicate with the one or more databases 214 as well as the network 270, as indicated by line 218, through the sending and receiving of digital data. Moreover, the database 214 may include any type of information regarding items that have been made available for sale through the marketplace 210, or ordered by customers, such as the customer 260, from the marketplace 210, or any information or data regarding the delivery of such items to the customers.

The fulfillment center 220 may be any facility that is adapted to receive, store, process and/or distribute items. As is shown in FIG. 2A, the fulfillment center 220 includes a desktop computer 222 or any other type or form of computing device having one or more computer processors, as well as stations for receiving, storing and distributing items to customers, including but not limited to a receiving station 221, a storage area 223 and a distribution station 225.

The fulfillment center 220 may operate one or more order processing and/or communication systems using a computing device such as the desktop computer 222 and/or software applications having one or more user interfaces 224 (e.g., a browser), or through one or more other computing devices or machines that may be connected to the network 270, as is indicated by line 228, in order to transmit or receive information in the form of digital or analog data, or for any other purpose. The desktop computer 222 may also operate or provide access to one or more reporting systems for receiving or displaying information or data regarding workflow operations, and may provide one or more interfaces, such as the user interface 224, for receiving interactions (e.g., text, numeric entries or selections) from one or more operators, users, workers or other persons in response to such information or data. The desktop computer 222 may be a general purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

The receiving station 221 may include any apparatuses that may be required in order to receive shipments of items at the fulfillment center 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 223 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 225 may include one or more regions or stations where items that have been retrieved from a designated storage area may be evaluated, prepared and packed for delivery from the fulfillment center 220 to addresses, locations or destinations specified by customers, also by way of carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 221 may be processed, and the items placed into storage within the storage areas 223 or, alternatively, transferred directly to the distribution station 225, or "cross-docked," for prompt delivery to one or more customers.

The fulfillment center 220 may further include one or more control systems that may generate instructions for conducting operations at one or more of the receiving station 221, the storage area 223 or the distribution station 225. Such control systems may be associated with the desktop computer 222 or with one or more other computing devices or machines, and may communicate with the receiving station 221, the storage area 223 or the distribution station 225 within the fulfillment center 220 by any known wired or wireless means, or with the marketplace 210, the truck 230, the worker 240 or the customer 260 over the network 270, as indicated by line 228, through the sending and receiving of digital data.

Additionally, the fulfillment center 220 may include one or more systems or devices (not shown in FIG. 2A) for determining a location of one or more elements therein, such as cameras or other image recording devices. Furthermore, the fulfillment center 220 may also include one or more workers or staff members, who may handle or transport items within the fulfillment center 220. Such workers may operate one or more computing devices or machines for registering the receipt, retrieval, transportation or storage of items within the fulfillment center, such as the desktop computer 222, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The truck 230 may be any motorized or non-motorized carrier or vehicle for transporting the worker 240 and one or more items, which may be prepared, packed and shipped in any type or form of container. For example, the truck 230 may be any type or form of light truck, medium truck or heavy truck, such as a platform truck, a flatbed truck, a tractor and/or trailer, as well as any form of van. Alternatively, those of ordinary skill in the pertinent arts will recognize that any other form or means of transportation may perform the functions of the truck 230 in accordance with the present disclosure, including but not limited to cars, trailers, freight cars, container ships or cargo aircraft (e.g., manned aircraft or unmanned aircraft, such as drones).

The worker 240 may handle or transport items within the fulfillment center 220, prepare such items for delivery to a customer, such as the customer 260, and deliver such items to the customer. For example, the worker 240 may retrieve items from a storage means within the storage area 223, transport the items to the distribution station 225, and prepare the items for delivery to one or more customers. Alternatively, the worker 240 may also transport, or "cross-dock," items directly from the receiving station 221 to the distribution station 225. Furthermore, the worker 240 may cause the placement of the prepared items onto a vehicle for delivery, such as the truck 230, and operate the truck 230 when causing a delivery of the items to a customer, such as the customer 260.

When the worker 240 is transporting items within the fulfillment center 220, preparing such items for delivery to a customer, or delivering the items to the customer, the worker 240 may operate one or more handheld devices 250, which may be a device that is specifically programmed or adapted for such purposes, or a general purpose device such a personal digital assistant, a digital media player, a smartphone, a tablet computer or a laptop computer, as well as a wearable computer device such as a pair of augmented reality glasses or a wristwatch, and may include any form of input and/or output peripherals such as scanners, readers, keyboards, keypads, touchscreens or pointing devices. For example, the worker 240 may confirm his or her retrieval of an item using the handheld device 250, as well as his or her placement of the item onto the truck 230, his or her delivery of the item to a destination using the truck 230, his or her arrival at the destination with the item, his or her retrieval of the item from the truck 230, and a completed delivery of the item to the destination at any time using the handheld device 250.

As is shown in FIG. 2B, the handheld device 250 may include or comprise one or more hardware components or software applications for performing one or more of the functions disclosed herein. For example, the handheld device 250 may include one or more computer processors 252, as well as a variety of sensors including a cellular telephone transceiver 254, a GPS receiver or sensor 255, an accelerometer 256, a gyroscope 257 or a compass 258. The cellular telephone transceiver 254 may be utilized to transmit or receive cellular telephone signals to or from a cellular telephone network source (not shown) in the form of audio communications, network communications packets, SMS or MMS text messages or any other form of data that may be transmitted by or through such means. The GPS receiver or sensor 255 may be adapted to receive signals (e.g., trilateration data or information) relating to a position of the handheld device 250 from one or more GPS satellites of a GPS network. The accelerometer 256 may be adapted to detect or measure accelerations of the handheld device 250 in one or more translational or rotational dimensions or directions. The gyroscope 257 may be adapted to determine an angular orientation or velocity of the handheld device 250 based on principles of angular momentum. The compass 258 may be adapted to determine one or more directions with respect to a frame of reference that is fixed with respect to the surface of the Earth (e.g., a pole thereof). Additionally, the handheld device 250 may further include any other sensors or components for determining positions, velocities, accelerations or orientations of the handheld device 250.

The handheld device 250 may be further configured to capture, record and/or analyze information or data regarding the positions, velocities, accelerations or orientations of the handheld device 250, and to analyze such data or information by one or more means, e.g., by aggregating or summing such data or information to form one or more qualitative or quantitative metrics of the movement of the handheld device 250. For example, a net vector indicative of any and all relevant movements of the handheld device 250, including but not limited to physical positions, velocities, accelerations or orientations of the handheld device 250, may be derived. Additionally, coefficients or scalars indicative of the relative movements of the handheld device 250, or activity of the worker 240 (e.g., driving, walking, running on any surface features) may also be defined.

Those of ordinary skill in the pertinent arts will recognize that the truck 230 may include or comprise one or more of the hardware components or software applications described above with regard to the handheld device 250, and that such components or applications may be used to perform one or more of the functions described herein. For example, the truck 230 may also include one or more computer processors, and sensors such as a cellular telephone transceiver, a GPS receiver or sensor, an accelerometer, a gyroscope or a compass, or any other sensors or components for determining positions, velocities, accelerations or orientations of the truck 230. Moreover, those of ordinary skill in the pertinent arts will recognize that, in addition to the truck 230, the worker 240 may utilize one or more other vehicles or machines in performing one or more tasks, and that such vehicles or machines may also be equipped with one or more similar hardware components or software applications, e.g., computer processors or any of the sensors or other components described herein. Those of ordinary skill in the pertinent arts will further recognize that hardware components or software applications associated with one or more of the truck 230, the worker 240 or the handheld device 250 may communicate with one or more other computing devices or machines that are or may be connected to the network 270, as is indicated by line 238, in order to transmit or receive information in the form of digital or analog data, or for any other purpose.

The customer 260 may be any entity or individual that wishes to download, purchase, rent, lease, borrow or otherwise obtain items (which may include goods, products, services or information of any type or form) from the marketplace 210. The customer 260 may utilize one or more computing devices, such as a smartphone 262 or any other like machine that may operate or access one or more software applications, such as a web browser (not shown) or a shopping application 264, and may be connected to or otherwise communicate with the marketplace 210, the fulfillment center 220, the truck 230 or the worker 240 through the network 270, as indicated by line 268, by the transmission and receipt of digital data. Moreover, the customer 260 may also receive deliveries or shipments of one or items from facilities maintained by or on behalf of the marketplace 210, such as the fulfillment center 220, by way of the truck 230 or other transportation means (e.g., cars, trailers, freight cars, container ships or cargo aircraft, including manned aircraft or unmanned aircraft, such as drones). Such deliveries or shipments may also be made to a location or destination identified by the customer 260, or to any recipient at the location or the destination.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center," a "worker" or a "customer," or like terms, may be automated steps performed by their respective computer systems, or implemented within software modules (or computer programs) executed by one or more general purpose computers. Moreover, process steps described as being performed by a "marketplace," a "fulfillment center," a "worker" or a "customer" may be typically performed by a human operator, but could, alternatively, be performed by an automated agent.

The marketplace 210, the fulfillment center 220, the truck 230, the worker 240 and/or the customer 260 may use any web-enabled or Internet applications or features, or any other client-server applications or features including electronic mail (or E-mail), or other messaging techniques, to connect to the network 270 or to communicate with one another, such as through short or multimedia messaging service (SMS or MMS) text messages. For example, the fulfillment center 220 and/or the desktop computer 222 may be adapted to transmit information or data in the form of synchronous or asynchronous messages to the server 212, the handheld device 250, the smartphone 262 or any other computer device in real time or in near-real time, or in one or more offline processes, via the network 270. Those of ordinary skill in the pertinent art would recognize that the marketplace 210, the fulfillment center 220, the truck 230, the worker 240 or the customer 260 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the desktop computer 222, the handheld device 250 or the smartphone 262, or any other computers or control systems utilized by the marketplace 210, the fulfillment center 220, the truck 230, the worker 240 or the customer 260 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
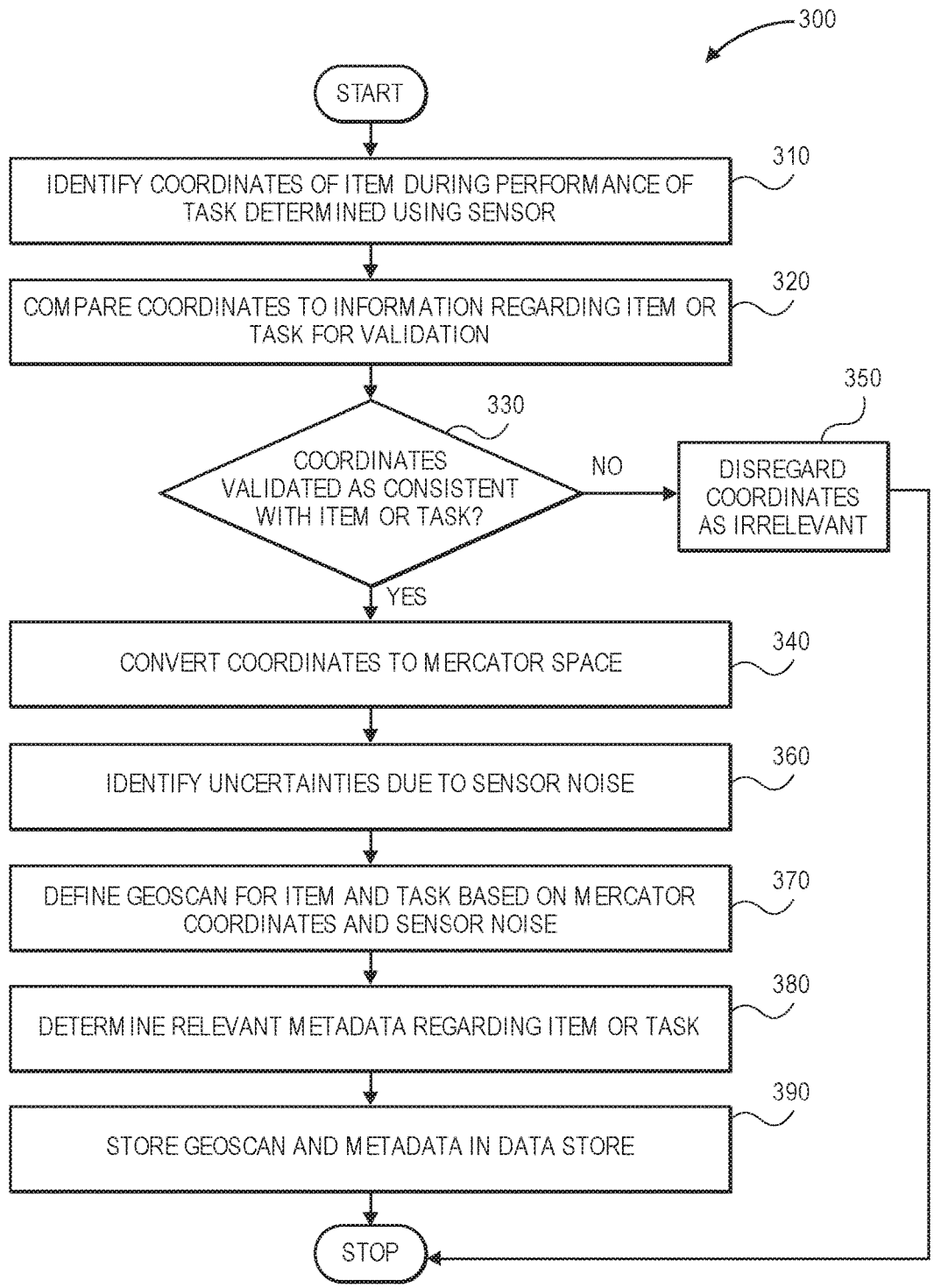
FIG. 3 is a flow chart of one process for determining routing points or delivery points in accordance with embodiments of the present disclosure.

As is discussed above, the systems and methods of the present disclosure are directed to identifying points or regions in space, such as routing points or delivery points, based on vectors or other sets of variables representative of one or more sets of sensed positions, as well as noise or levels of accuracy or tolerance (or levels of uncertainty) associated with the sensing of the positions. Referring to FIG. 3, a flow chart 300 representing one embodiment of a process for determining a routing point or a delivery point in accordance with embodiments of the present disclosure is shown.

At box 310, coordinates of an item that were determined using a sensor during the performance of a task are identified. For example, in some embodiments of the present disclosure, when an order for the item is received via an online marketplace, and the order is to be delivered from a fulfillment center to a destination specified in the order, a bar code or other marked identifier on the item may be scanned at a given point using a GPS-enabled handheld device. A location of the handheld device at a time when the item is scanned may be determined, and the location of the handheld device may be associated with or imputed to the item being scanned.

At box 320, the coordinates are compared to information regarding the item or the task for validation. If a task involves delivering an item to a destination, and the coordinates are not located within a sufficient range of the destination, or if the coordinates were determined at a time that conflicts with one or more elements of the task, then the coordinates may be unhelpful in deriving a delivery point or a routing point for the item or the task. Any available information regarding the coordinates, the item or the task may be utilized in validating the coordinates. For example, the coordinates may be compared to information or data regarding the location, including one or more ZIP codes, street names or locations, property data, municipality information or the like, as well as specific information such as street attributes, lot descriptions, building footprints or other spatial entities or references associated with the location, in order to validate the coordinates as consistent with the item or the task.

At box 330, if the coordinates are not validated as consistent with the item or the task, then the process advances to box 350, where the coordinates are disregarded as irrelevant, and the process ends. The coordinates may have been related to an outlying or aberrant situation, or have been identified prematurely or in error. If the coordinates are validated as consistent with the item or the task, however, then the process advances to box 340, where the coordinates are converted to a Mercator projection, e.g., the Uniform Transverse Mercator (or "UTM") projection standard. For example, where the coordinates are latitudes and longitudes according to the World Geodesic System 1984 (or "WGS84") geodetic datum, the coordinates may be converted to a metric-based standard, such as the UTM projection standard. Alternatively, in some embodiments, the coordinates identified at box 310 need not be converted to any other projection or standard, and may be considered in their original form (e.g., the WGS84 standard).

At box 360, uncertainties due to a level of noise associated with the sensor is determined. The sensor noise may be based on intrinsic factors associated with the sensor (e.g., one or more physical, material or operational properties of the sensor), or any other relevant factor, and may reflect the uncertainty associated with the use of the sensor to determine the coordinates of the item in a given physical environment. For example, in some GPS systems, a level of accuracy of approximately two to ten meters (2-10 m) may be presumed, to a ninety-five percent (95%) degree of tolerance. At box 370, a geoscan is defined for the item and the task based on the Mercator coordinates derived at box 340 and the uncertainties identified at box 360. For example, the geoscan may be modeled as multidimensional Gaussian distribution having a center, or a mean, at the estimated location of the item determined at box 310 and with major and/or minor axes corresponding to estimated uncertainties (e.g., noise). The uncertainties may be based on not only the sensor noise determined at box 360 but also process noise (e.g., process-based uncertainties associated with the scanning of the item or the physical environment in which item was scanned, including but not limited to differences or inconsistencies in the behavior of one or more persons in scanning the item).

At box 380, metadata regarding the item or the task is determined. For example, the metadata may relate to a date or a time when the coordinates were determined using the sensor at box 310, atmospheric and/or weather conditions on the date or at the time when the coordinates were determined, or any other factors or events that may relate to either the item or the task (e.g., an identity of a worker performing the task, or a public event taking place as the task was being performed), or have been present or occurring at the time. At box 390, the geoscan for the item and the task is stored in at least one data store, along with the metadata determined at box 380, and the process ends.

Figure 4A:
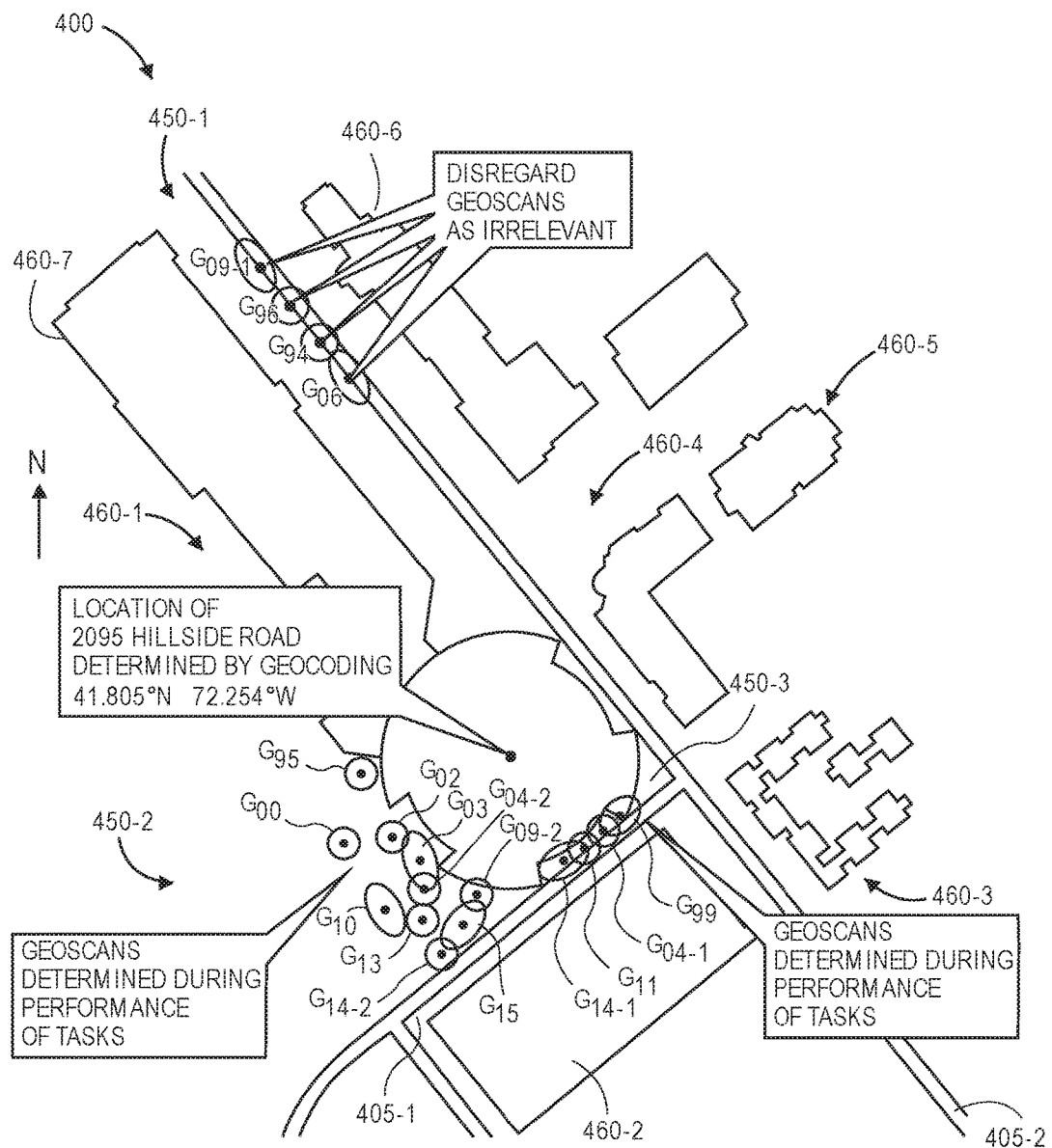
FIGS. 4A through 4C are views of aspects of one system for determining routing points or delivery points in accordance with embodiments of the present disclosure.
Figure 4B:
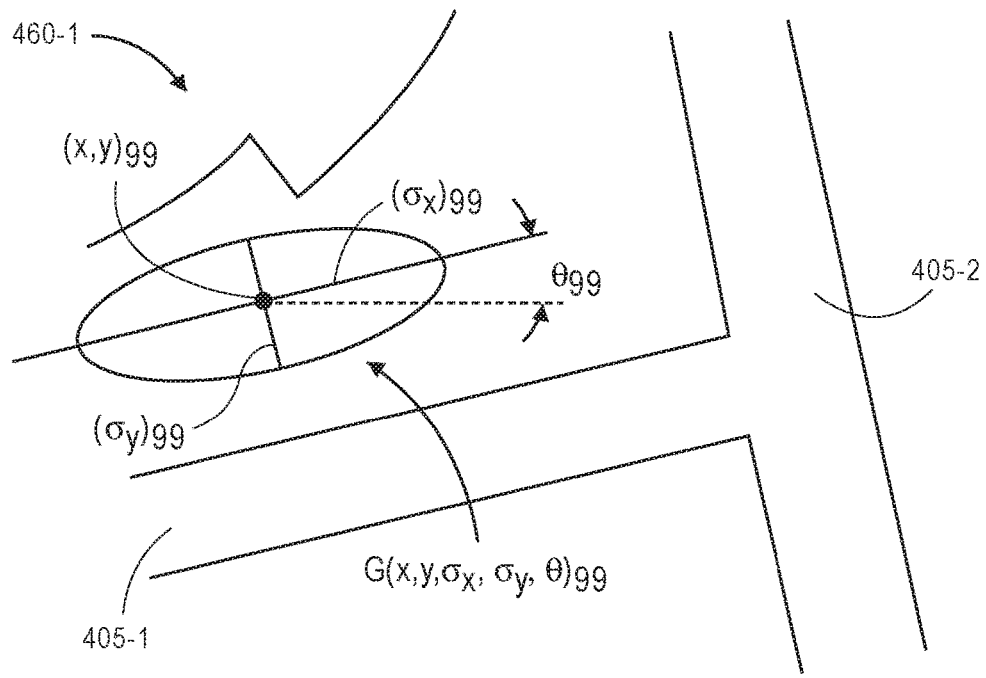
Figure 4C:
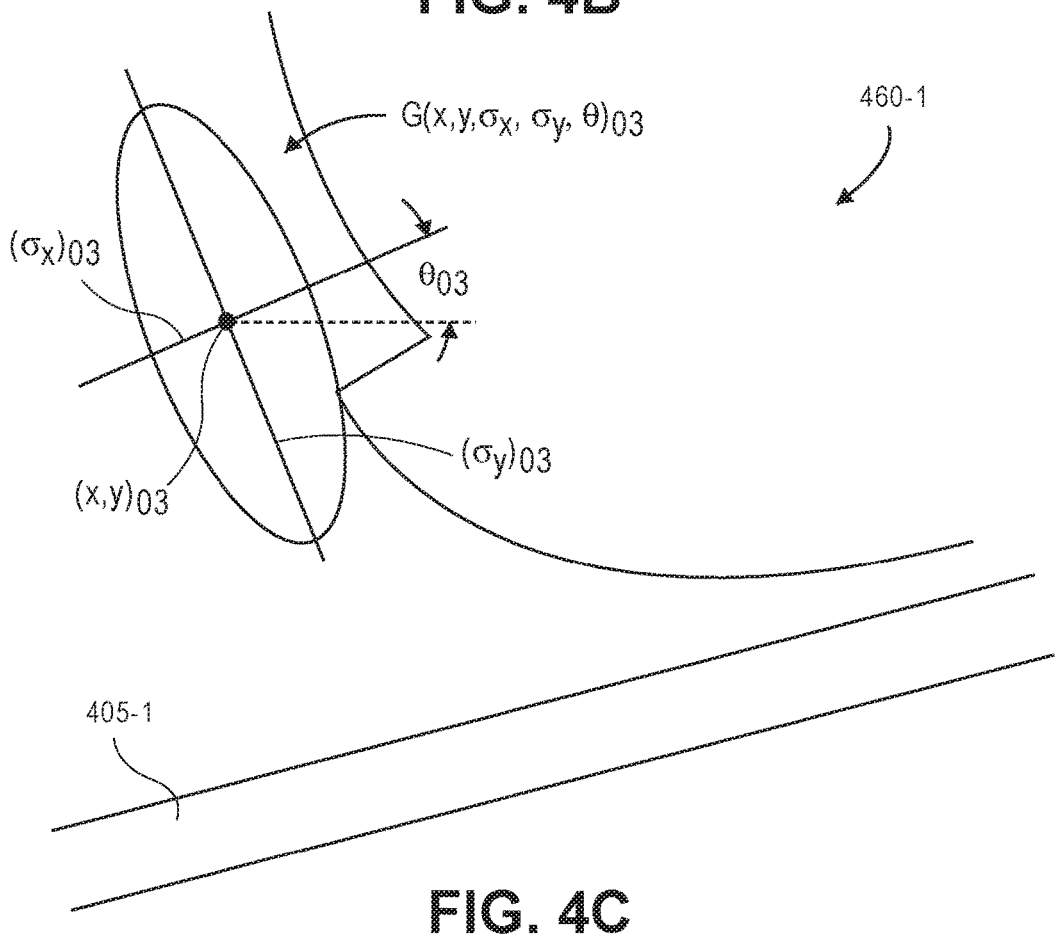

As is discussed above, each of the geoscans may be modeled as any type or form of probability distribution, including but not limited to a multidimensional Gaussian distribution. For example, in applications regarding the delivery of one or more items via ground-based transit, a two-dimensional model of the location of the geoscan, and the levels of uncertainty of the geoscan, is appropriate. Referring to FIGS. 4A, 4B and 4C, views of aspects of one system 400 for determining routing points or delivery points in accordance with embodiments of the present disclosure are shown. Except where otherwise noted, reference numerals preceded by the number "4" in FIG. 4A, FIG. 4B or FIG. 4C refer to elements that are similar to elements having reference numerals preceded by the number "2" in FIG. 2A or FIG. 2B or by the number "1" shown in FIGS. 1A through 1E.

As is shown in FIG. 4A, the system 400 includes a location 460-1 at which a task is to be performed (e.g., a domed arena located at 2095 Hillside Road) and a plurality of locations 460-2, 460-3, 460-4, 460-5, 460-6, 460-7 that are bounded or traversed by streets 405-1, 405-2. The system 400 includes a first set of geoscans 450-1, viz., geoscans $G_{09-1}$, $G_{96}$, $G_{94}$, $G_{06}$. The system 400 further includes a second set of geoscans 450-2, viz., $G_{95}$, $G_{00}$, $G_{02}$, $G_{03}$, $G_{04-2}$, $G_{09-2}$, $G_{10}$, $G_{13}$, $G_{14-2}$, $G_{15}$, and a third set of geoscans 450-3, viz., $G_{99}$, $G_{04-1}$, $G_{11}$, $G_{14-1}$. Each of the geoscans of the first set 450-1, the second set 450-2 or the third set 450-3 is a vector representative of a distribution and includes information regarding a coordinate in an x-direction $x_i$, a coordinate in a y-direction $y_i$, a standard deviation in the x-direction $(\sigma_x)_i$, a standard deviation in the y-direction $(\sigma_y)_i$ and an angle of orientation $\theta_i$.

As is discussed above, optimal or preferred points or regions in space for the performance of a task at a location may be identified or received in any manner, e.g., from coordinates received from or identified by a handheld device or other computer device associated with the performance of the task at the location, and filtered or validated for their relevance to the task. Because the coordinates of the first set of geoscans 450-1 are sufficiently distant from the location 460-1, e.g., each of the geoscans $G_{09-1}$, $G_{96}$, $G_{94}$, $G_{06}$ is located farther down the street 405-2 than the location 460-1, or in closer proximity to other locations 460-6, 460-7 than to the location 460-1, the coordinates of the first set 450-1 may be disregarded from any analysis concerning the performance of a task at the location 460-1.

Where coordinates are properly filtered or otherwise validated based on their relevance to the performance of a task, however, a geoscan may be formed thereby. As is shown in FIG. 4A, the second set of the geoscans 450-2 are generally clustered along a southwestern side of the location 460-1, while the third set of the geoscans 450-3 are generally clustered along a southeastern side of the location 460-1. Given their proximity or association with one another at the location 460-1, e.g., ingress or egress points for the location 460-1, the geoscans of the second set 450-2 and the third set 450-3 may each be assumed to constitute or indicate a point of interest at the location 460-1, e.g., ingress/egress points for the location 460-1, and the geoscans of the second set 450-2 and the third set 450-3 may be used to define location hypotheses, or areas of uncertainty from which points or regions in space associated with the performance of the task at the location 460-1 may be defined. The geoscans of the second set 450-2 and the third set 450-3 differ from a position of the location 460-1 that may be identified through traditional geocoding techniques, e.g., a latitude of 41.805° N and a longitude of 72.254° W, both physically and functionally, as this position corresponds to an inaccessible top of a domed arena and not to any point or region in space that is accessible to pedestrians.

As is discussed above, geoscans may be vectors or other sets of variables that define a probability distribution, such as a Gaussian distribution including coordinates of a position and noise or a level of uncertainty associated with the position, such as a standard deviation. Referring to FIG. 4B, the geoscan $G_{99}$ of the third set of geoscans 450-3 shown in FIG. 4A is shown. As shown in FIG. 4B, the geoscan $G_{99}$ includes a pair of coordinates constituting a mean location, e.g., $(x,y)_{99}$, standard deviations in the x-direction and y-direction, $(\sigma_x)_{99}$ and $(\sigma_y)_{99}$ and an angle of orientation $\theta_{99}$.

The geoscan $G_{99}$ thus defines an ellipse that is adjacent to the location 460-1, in a vicinity of an intersection of the streets 405-1, 405-2, and lies roughly parallel to the street 405-1 at the angle of orientation $\theta_{99}$. Referring to FIG. 4C, the geoscan $G_{03}$ of the second set of geoscans 450-2 shown in FIG. 4A is shown. As shown in FIG. 4C, the geoscan $G_{03}$ includes a pair of coordinates constituting a mean location, e.g., $(x,y)_{03}$, and standard deviations in the x-direction and y-direction, $(\sigma_x)_3$ and $(\sigma_y)_{03}$. The geoscan $G_{03}$ thus defines an ellipse that is adjacent to the location 460-1, in a vicinity of the street 405-1, and is aligned roughly perpendicular to the street 405-1 at the angle of orientation $\theta_{03}$.

Although the aspects of the system 400 shown in FIGS. 4A, 4B and 4C refer only to two-dimensional coordinates or geoscans, e.g., coordinates and/or standard deviations in an x-direction $x_i$ or in a y-direction $y_i$ only, those of ordinary skill in the pertinent arts will recognize that the systems and methods disclosed herein may be utilized in connection with three-dimensional applications. For example, a geoscan may be defined based on latitudes, longitudes and heights or altitudes, and may include coordinates and/or standard deviations in not only an x-direction x and a y-direction but also a z-direction. Whereas a two-dimensional area of uncertainty associated with a geoscan may be expressed as a circle, an ellipse or a similar shape corresponding to coordinates of the geoscan and known errors associated with the coordinates in the two dimensions at a given time, a three-dimensional volume of uncertainty may be expressed as a sphere, an oblong spheroid, an ovoid, a prolate spheroid or an oblate spheroid, or another similar shape corresponding to coordinates of the geoscan and known errors associated with the coordinates in the three dimensions at the given time.

As is also discussed above, geoscans defined in association with a location based on a set of coordinates and uncertainty associated with such coordinates may be used to form location hypotheses or areas of uncertainty, e.g., clusters or groups of geoscans that may correspond to points or regions of interest with regard to the location, or the performance of any number of tasks there. In some embodiments, a location hypothesis may be derived for a location based on a geolocator and/or one or more geocodes associated with the location, e.g., a centroid of a structure or lot at the location, or a point alongside a street bounding the location. A probability distribution associated with a geocode determined during the performance of a task at a location may be compared to probability distributions of one or more of a set of existing location hypotheses for the performance of tasks at the location. If the geocode matches one of the existing location hypotheses, then the geocode may be used to update the matching location hypothesis using covariance matrices of the geocode and the matching location hypothesis. If the geocode does not match any of the existing location hypotheses, however, then a new location hypothesis may be defined based on the geocode, and added to the set of existing location hypotheses.

Figure 5:
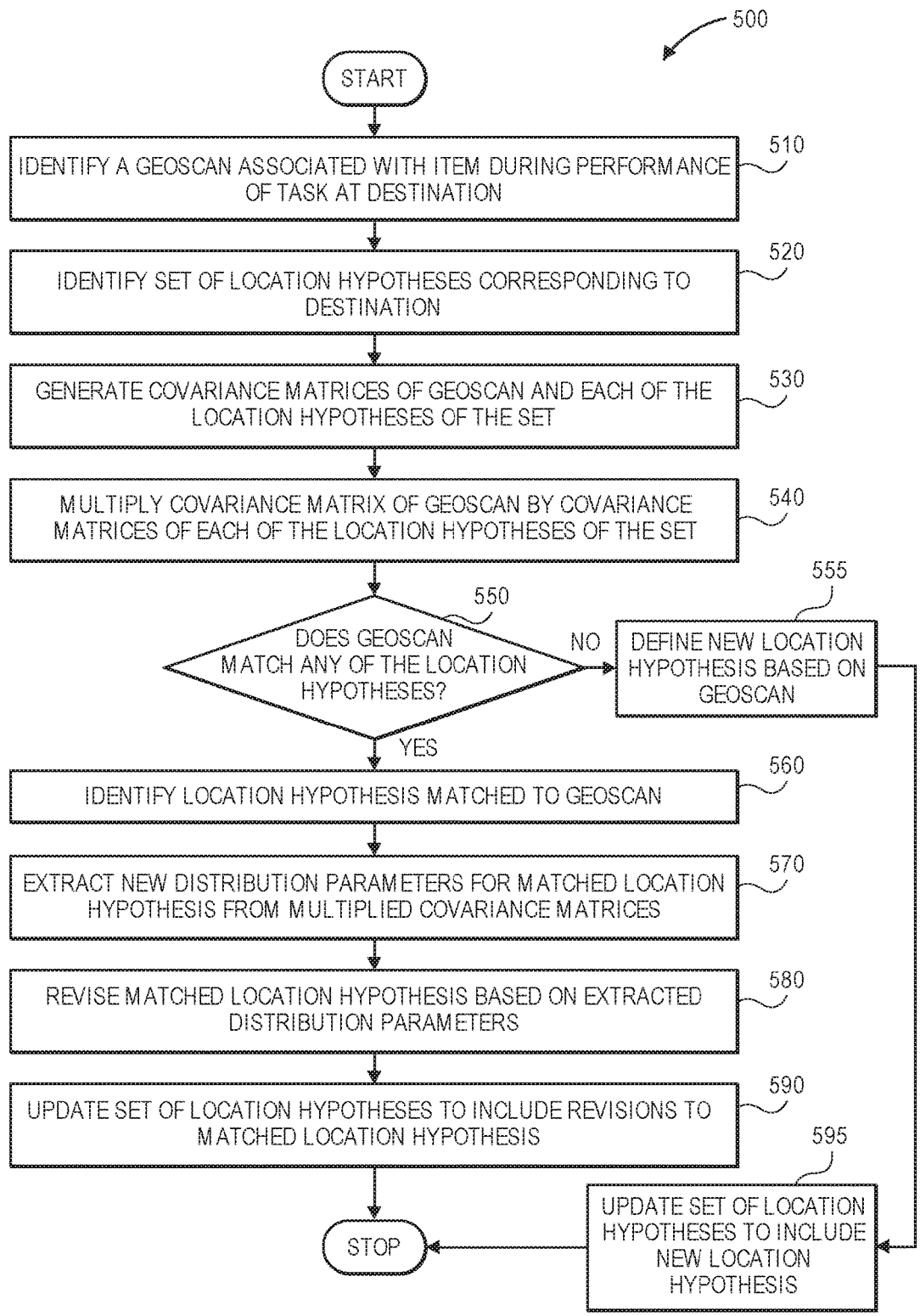
FIG. 5 is a flow chart of one process for determining routing points or delivery points in accordance with embodiments of the present disclosure.

Referring to FIG. 5, a flow chart 500 representing one embodiment of a process for determining a routing point or a delivery point in accordance with embodiments of the present disclosure is shown.

At box 510, a geoscan associated with an item during the performance of a task at a destination is identified, and at box 520, a set of location hypotheses corresponding to the destination is identified. As is discussed above, a geoscan may represent a position and any associated information, data or metadata regarding sensor noise or a level of uncertainty of the position in a Gaussian distribution that includes coordinates of the position and the sensor noise or the level of uncertainty of the position, such as a standard deviation, and location hypotheses may be defined based on geolocations identified using a geocoder or on one or more geoscans, also according to Gaussian distributions, for the given location.

At box 530, covariance matrices are generated for the geoscan and for each of the location hypotheses in the set, and at box 540, the covariance matrix of the geoscan is multiplied by the covariance matrices of each of the location hypotheses of the set. At box 550, whether the geoscan matches any of the location hypotheses is determined based at least in part on the products of the covariance matrix of the geoscan and the covariance matrices of the respective location hypotheses of the set.

If the geoscan matches a location hypothesis, then the process advances to box 560, where the location hypothesis matched by the geoscan is identified, and to box 570, where new distribution parameters for the location hypothesis are extracted from the multiplied covariance matrices. For example, if coordinates of the geoscan, or an area of uncertainty of the geoscan, fall within, near or overlap coordinates or an area of uncertainty of one of the location hypotheses, the product of the covariance matrix of the geoscan and the covariance matrix of the one of the location hypotheses will identify the extent to which the one of the location hypotheses will narrow by incorporating the geoscan therein. At box 580, the location hypothesis matching the geoscan is revised based on the extracted distribution parameters, which may include an updated mean location for the location hypothesis, updated standard deviations for the location hypothesis in one or more directions or along one or more axes, and an updated angle of orientation of the location hypothesis. At box 590, the set of location hypotheses is updated to include the revised location hypothesis, and the process ends.

If the geoscan does not match any of the location hypotheses in the set at box 550, then the process advances to box 555, where a new location hypothesis is defined based on the geoscan. The new location hypothesis may based on coordinates or uncertainties associated with the geoscan, e.g., sensor noise or other uncertainties, or on any other relevant factor, including but not limited to information regarding architectural or topographical features that may be known regarding the destination. At box 595, the set of location hypotheses is updated to include the new location hypothesis defined at box 555, and the process ends.

The formation of location hypotheses based on geoscans may be shown with regard to FIGS. 6A through 6F. Referring to FIGS. 6A through 6F, views of aspects of one system 600 for determining routing points or delivery points in accordance with embodiments of the present disclosure are shown. Except where otherwise noted, reference numerals preceded by the number "6" in FIGS. 6A through 6F refer to elements that are similar to elements having reference numerals preceded by the number "4" in FIG. 4A, FIG. 4B or FIG. 4C, by the number "2" in FIG. 2A or FIG. 2B or by the number "1" shown in FIGS. 1A through 1E.

Figure 6A:
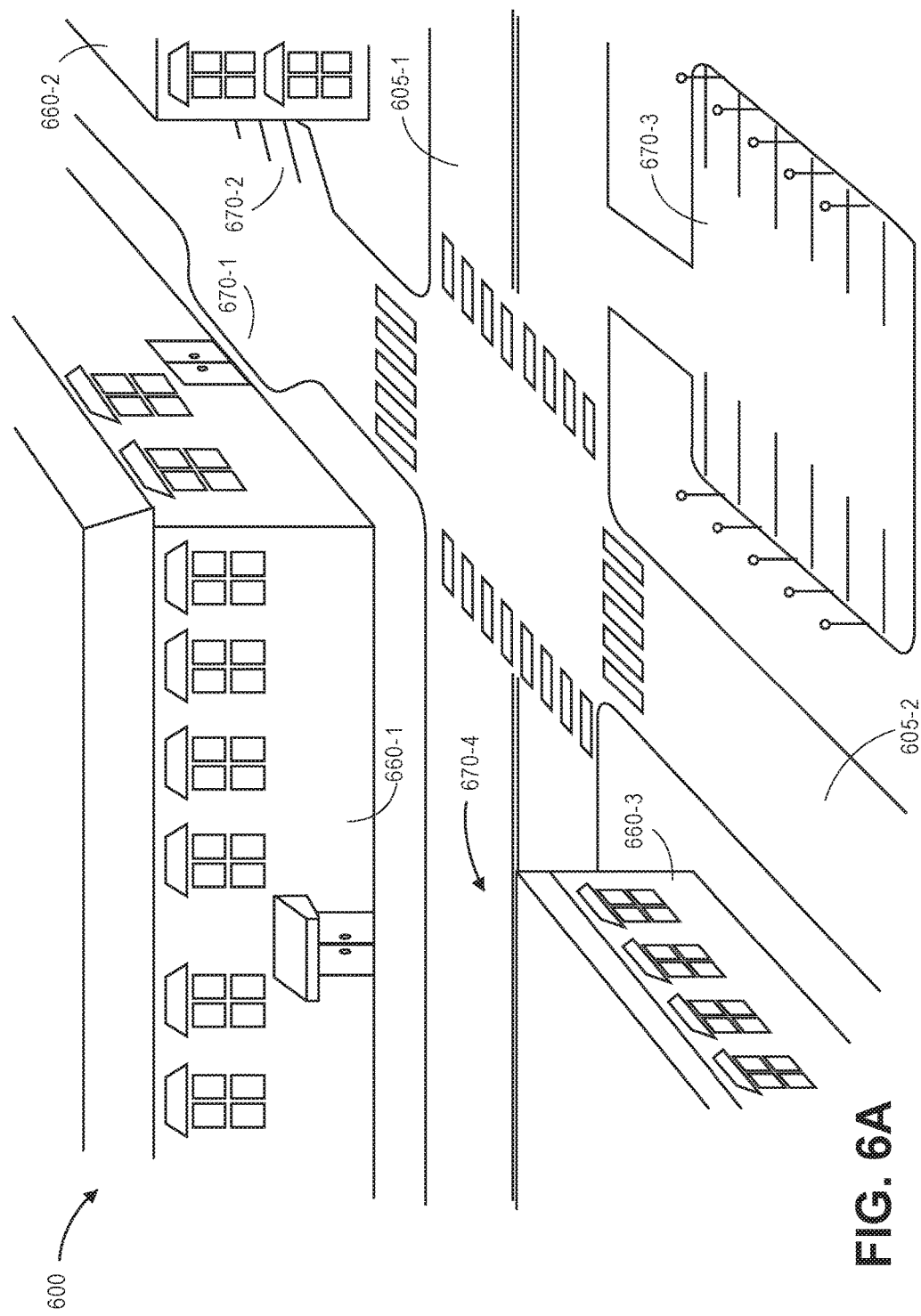
FIGS. 6A through 6F are views of aspects of one system for determining routing points or delivery points in accordance with embodiments of the present disclosure.

Referring to FIG. 6A, the system 600 includes a location 660-1 at which a task is to be performed, e.g., the delivery of one or more items to the location 660-1, a plurality of other locations 660-2, 660-3, and a plurality of parking facilities 670-1, 670-2, 670-3, 670-4. The locations 660-1, 660-2, 660-3 and the parking facilities 670-1, 670-2, 670-3, 670-4 are bounded by streets 605-1, 605-2.

Figure 6B:
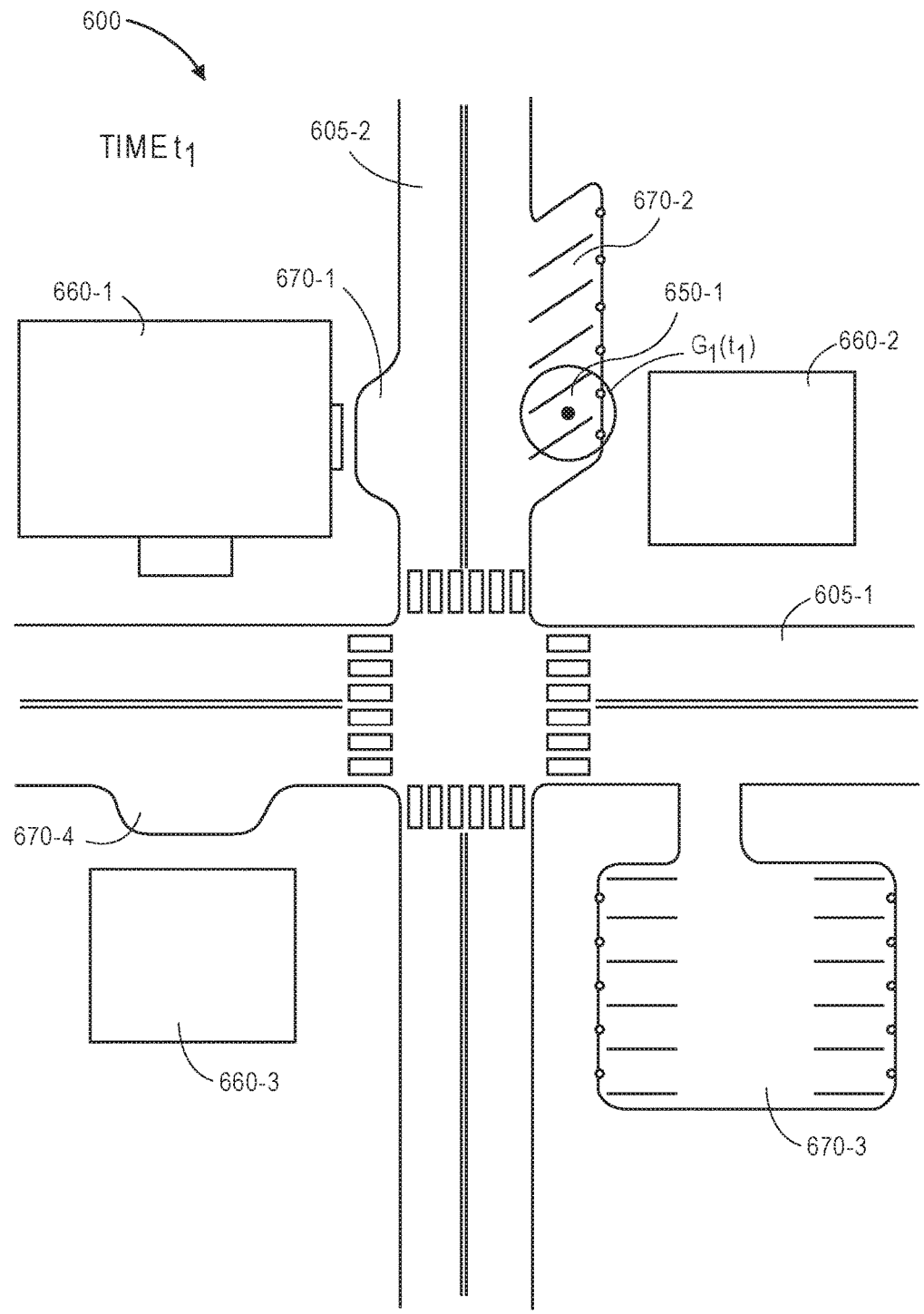

As is discussed above, a geoscan may be defined as a Gaussian distribution based on a set of coordinates at a location, and a level or measure of the uncertainty associated with the coordinates, e.g., due to sensor noise or any other factor, identified during the performance of a task. Referring to FIG. 6B, a geoscan 650-1, or $G_1(t_1)$, is shown in one space of the parking facility 670-2 at time $t_1$. The geoscan 650-1 may be derived based on coordinates determined upon the scanning of a bar code or other marked identifier on an external surface of an item, or in any other manner, and is located across the street 605-2 from an entrance to the location 660-1.

Figure 6C:
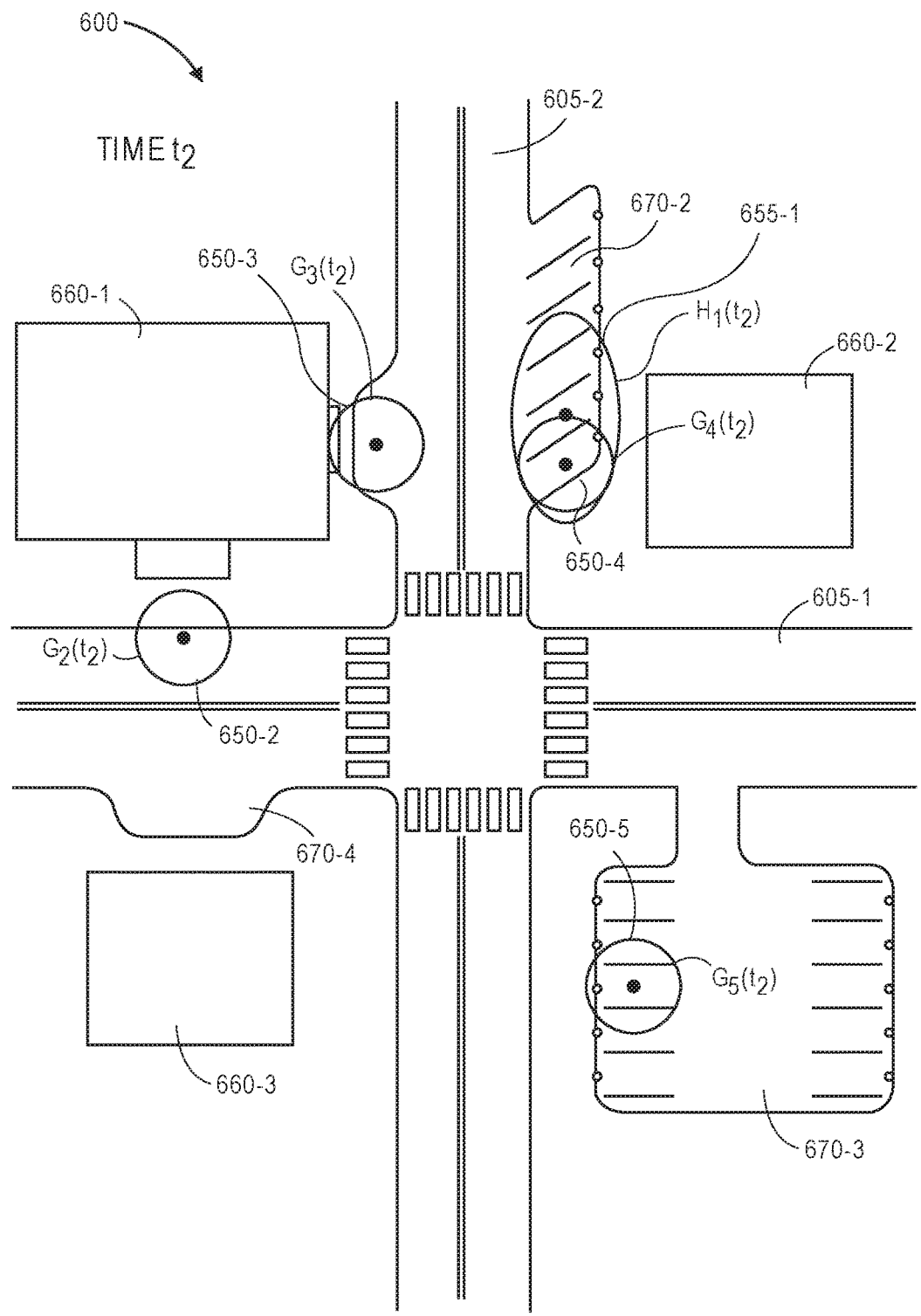

As is also discussed above, a location hypothesis may be defined for the performance of a task at a location based on one or more geoscans defined within a vicinity of the location. Referring to FIG. 6C, a location hypothesis $H_1(t_2)$ is defined for the location 660-1 at time $t_2$ based on the geoscan 650-1 of FIG. 6B. The location hypothesis 655-1, or $H_1(t_2)$, represents a Gaussian distribution derived from the geoscan 650-1 and any additional relevant information, including but not limited to coordinates of a centroid of the location 660-1, or of one or more structures at the location 660-1, or one or more measures of a level of uncertainty associated with such coordinates. Additionally, geoscans 650-2, 650-3, 650-4, 650-5 or $G_2(t_2)$, $G_3(t_2)$, $G_4(t_2)$, $G_5(t_2)$, are also derived at time $t_2$, e.g., based on coordinates identified following the scanning of bar codes or other identifiers on items, and levels of uncertainty associated with such coordinates.

Figure 6D:
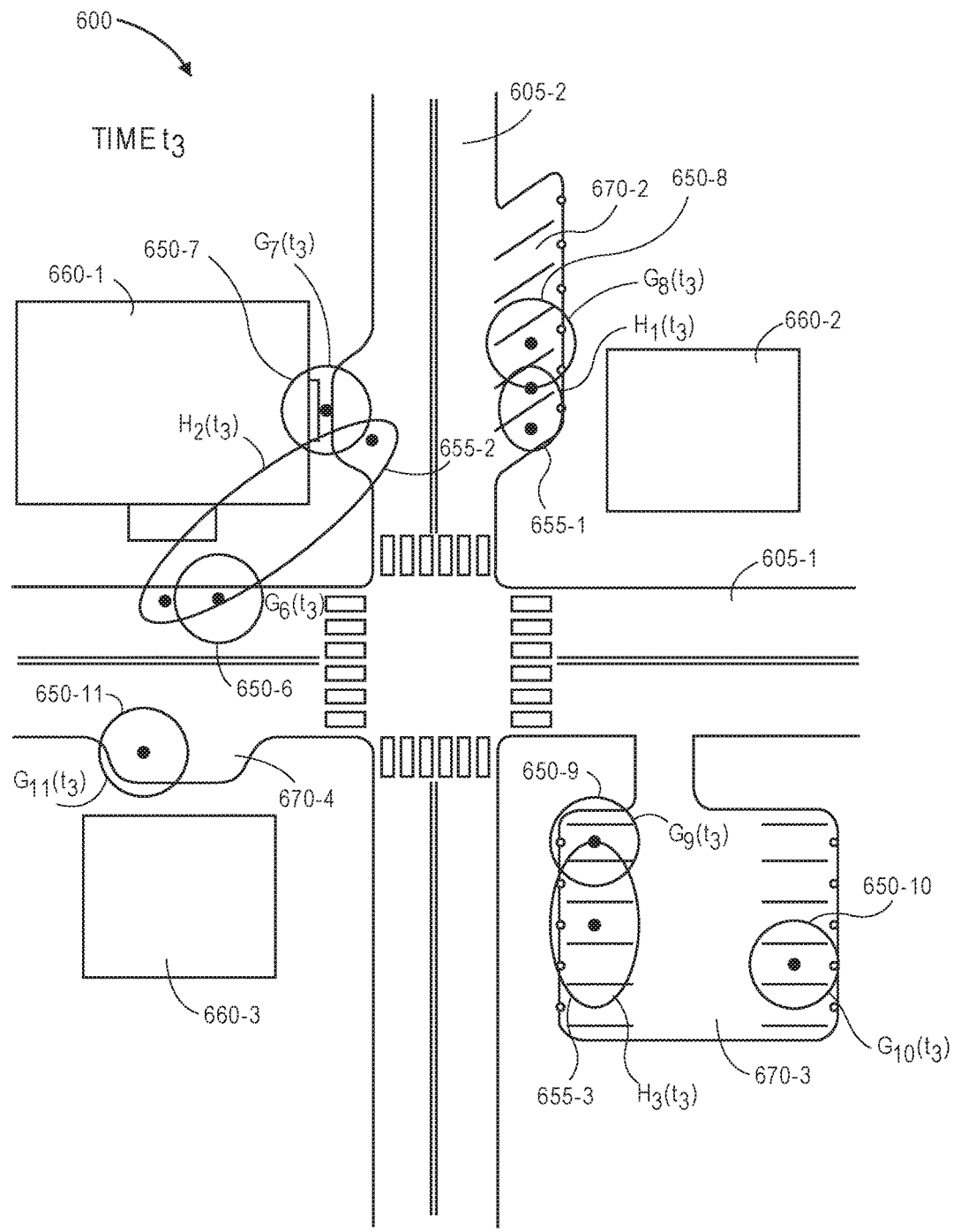

Location hypotheses may also be defined or refined based on geocodes subsequently defined based on coordinates identified at later times, uncertainties associated with such coordinates, or further information or data regarding the environments in which such coordinates are located. Referring to FIG. 6D, location hypotheses 655-1, 655-2, 655-3, or $H_1(t_3)$, $H_2(t_3)$, $H_3(t_3)$, are shown for the location 660-1 at time $t_3$. The location hypothesis 655-1, which was originally defined for the location 660-1 based on the geoscan 650-1 in the parking facility 670-2 at time $t_1$, as is shown in FIG. 6B, is shown as having been updated based on the geoscan 650-4 in the parking facility 670-2 at time $t_2$, as is shown in FIG. 6C. The location hypothesis 655-2 represents a Gaussian distribution derived at time $t_3$ from the geoscans 650-2, 650-3 adjacent to the location 660-1 at time $t_2$ and any additional relevant information regarding the location 660-1, as are shown in FIG. 6C. The location hypothesis 655-3 represents a Gaussian distribution derived at time $t_3$ from the geoscan 650-5 in the parking facility 670-3 at time $t_2$, and any additional relevant information regarding the location 660-1.

Over time, location hypotheses may be continuously refined as multiple geoscans are identified, and as additional information regarding such geoscans or the location 660-1 is determined. For example, in some embodiments, when additional geoscans are identified and associated with a location hypothesis, the uncertainties of the location hypothesis may be reduced thereby, and a size of the location hypothesis may narrow accordingly. Furthermore, in some other embodiments, where additional geoscans that are added to a location hypothesis result in the formation of two discrete subregions of geoscans within the location hypothesis, the location hypothesis itself may split into two separate subregions, e.g., similar to an amoeba, which may be considered independently when geoscans are subsequently identified.

Figure 6E:
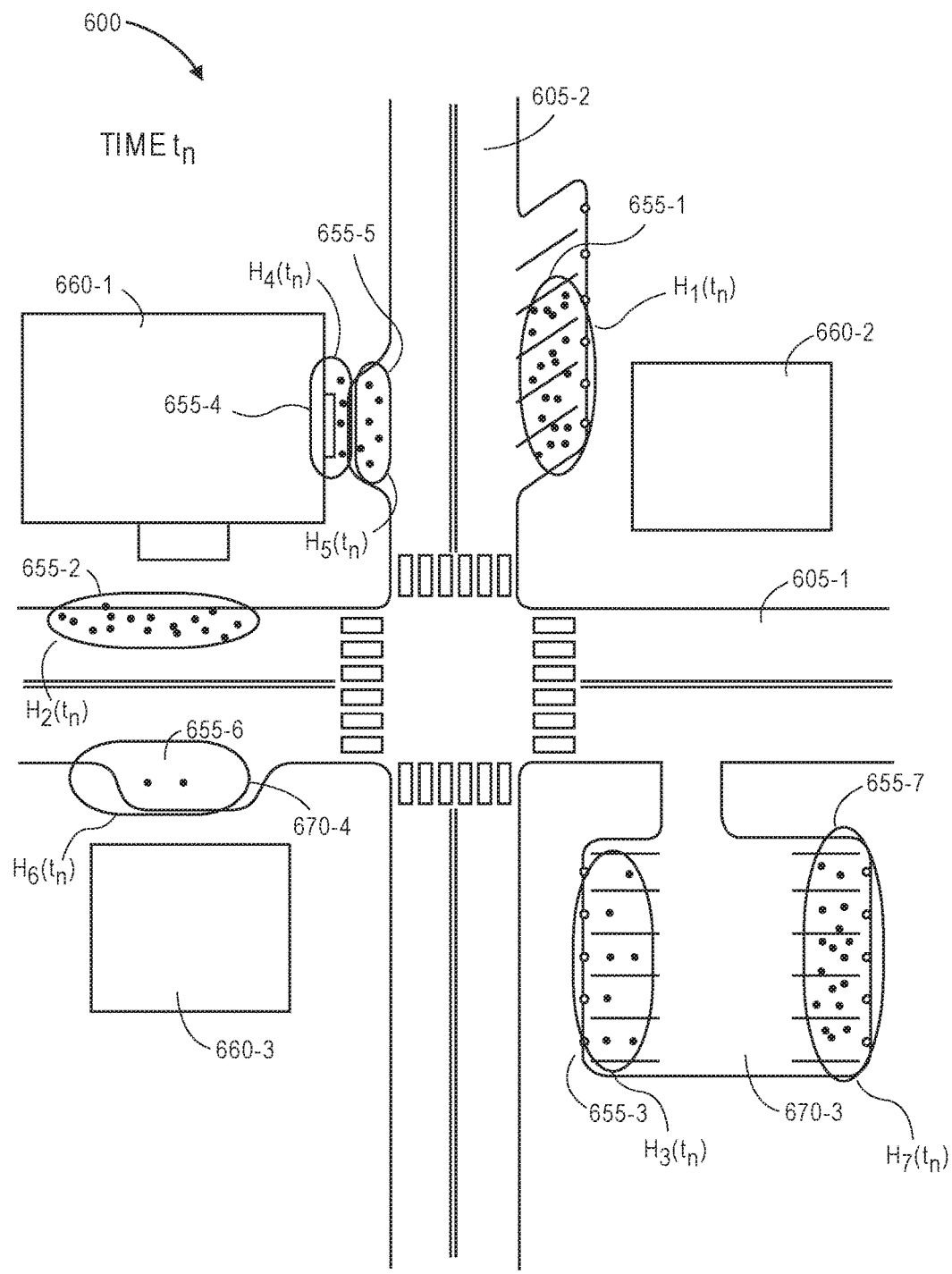

Referring to FIG. 6E, location hypotheses 655-1, 655-2, 655-3, 655-4, 655-5, 655-6, 655-7, or $H_1(t_n)$, $H_2(t_n)$, $H_3(t_n)$, $H_4(t_n)$, $H_5(t_n)$, $H_6(t_n)$, $H_7(t_n)$ are shown for the location 660-1 at time $t_n$. As further geoscans are iteratively identified and added to matching location hypotheses, the uncertainties of such location hypotheses may be further reduced, resulting in narrowly defined hypothetical locations to which subsequent geoscans may be iteratively added, thereby enabling such uncertainties to be reduced accordingly. For example, as is shown in FIG. 6E, location hypotheses 655-4, 655-5, or $H_4(t_n)$, $H_5(t_n)$, are spun off from the location hypothesis 655-2, or $H_2(t_3)$, as is shown in FIGS. 6D and 6E, such as additional geoscans 650-6, 650-7, or $G_6(t_3)$, $G_7(t_3)$, are identified. After a sufficient number of geoscans have been received in connection with the location 660-1, e.g., when an item is scanned or otherwise acknowledged within a vicinity of the location 660-1, a number of points or regions in space may be defined as associated with the location 660-1 accordingly. Furthermore, such points may evaluated against known information regarding architectural or topographical features within a vicinity of the location 660-1, in order to determine whether such points are routing points (e.g., intended primarily for vehicles), delivery points, or neither routing points nor delivery points.

Figure 6F:
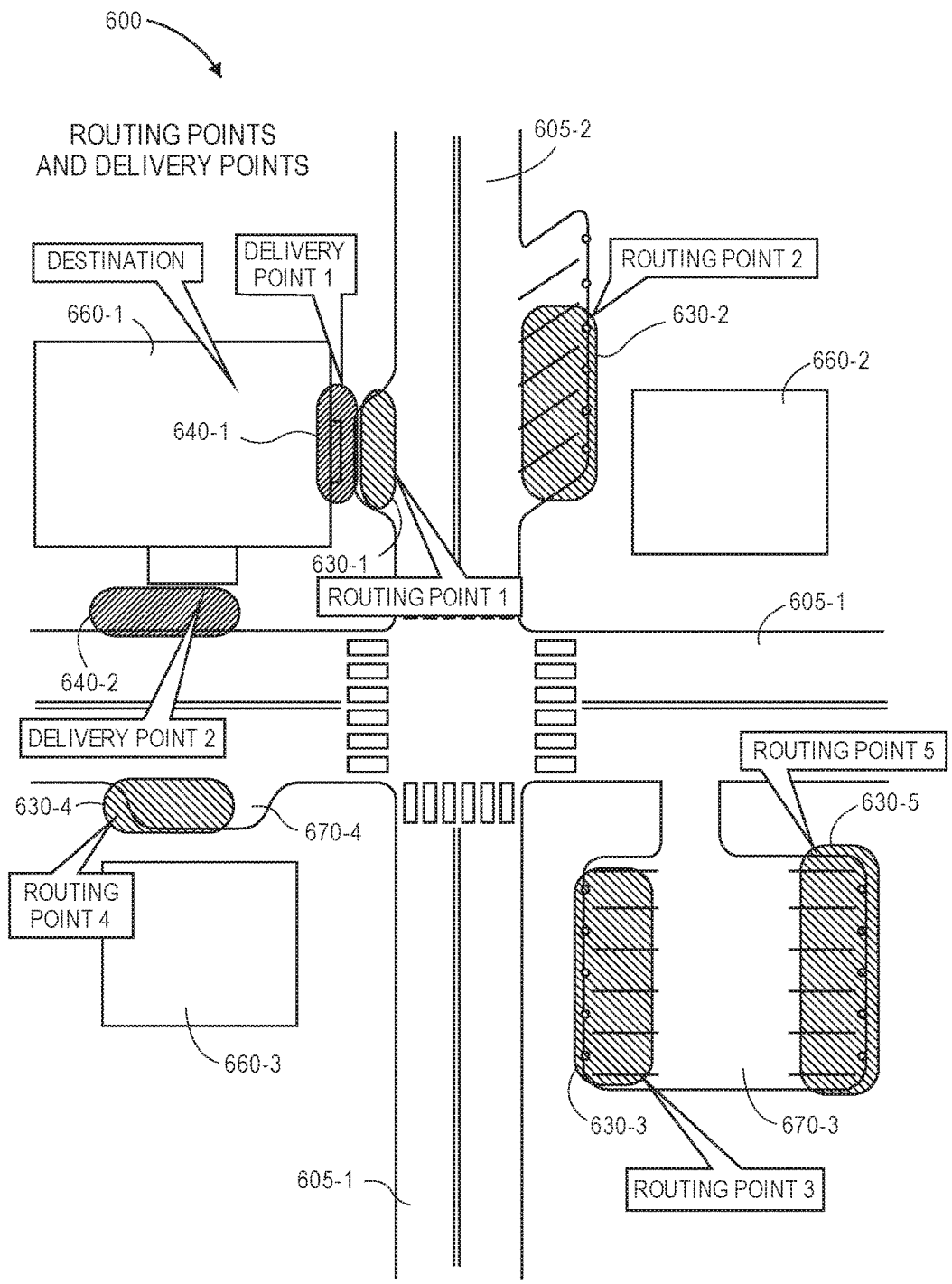

Referring to FIG. 6F, routing points 630-1, 630-2, 630-3, 630-4, 630-5 and delivery points 640-1, 640-2 are defined for the location 660-1 based on the location hypotheses 655-1, 655-2, 655-3, 655-4, 655-5, 655-6, 655-7 of FIG. 6E. Using such points, one or more paths for performing a task, e.g., the delivery of items to the location 660-1, may be determined based on any attributes relating to the task or the location 660-1. For example, a shortest path including driving directions for a vehicle to travel to one of the routing points 630-1, 630-2, 630-3, 630-4, 630-5 and walking directions for a person to travel from the one of the routing points 630-1, 630-2, 630-3, 630-4, 630-5 to one of the delivery points 640-1, 640-2 on any mathematical or logical basis, or subject to any temporal, weather, seasonal, legal or regulatory considerations, or other considerations, may be determined.

Figure 7:
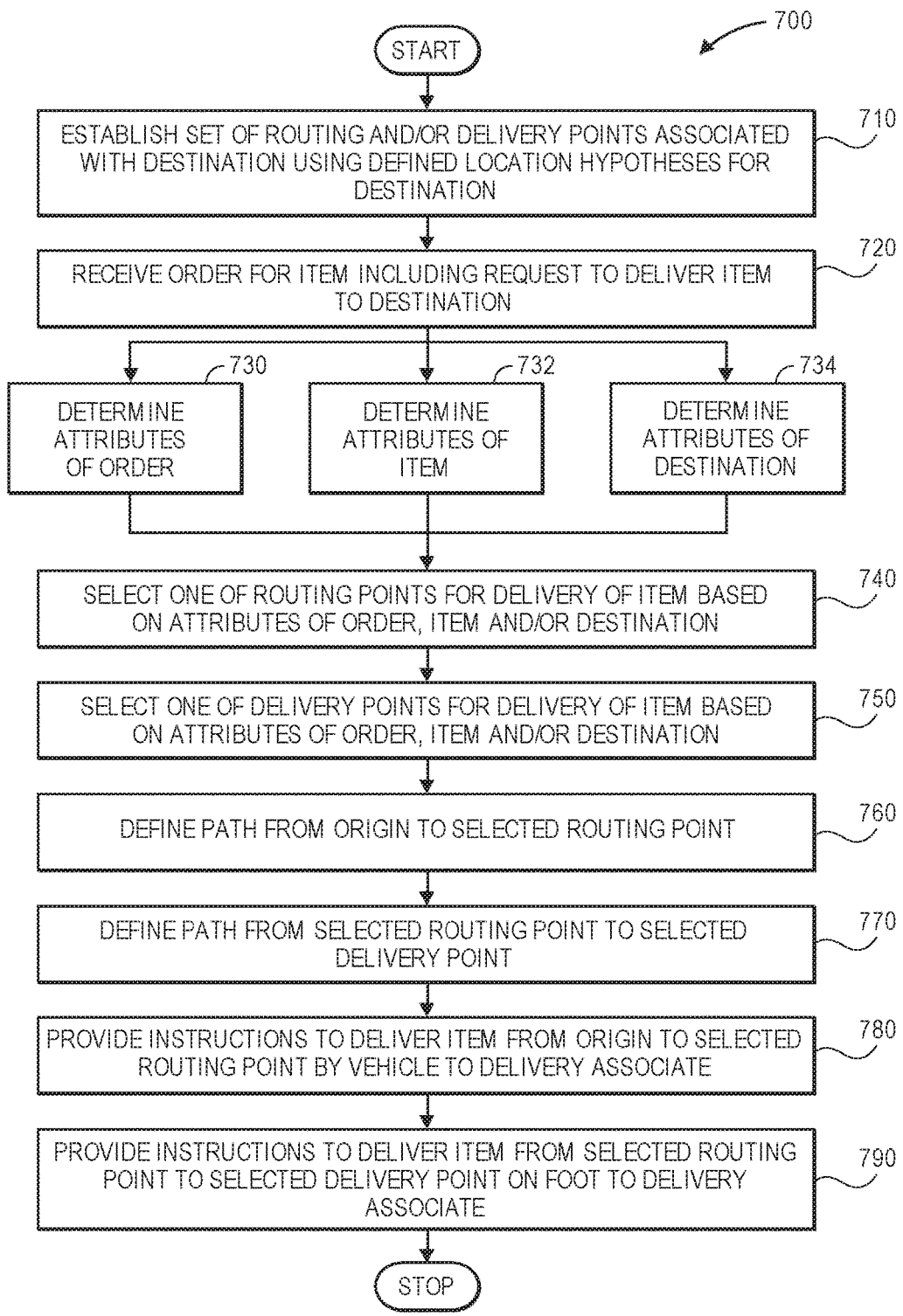
FIG. 7 is a flow chart of one process for determining routing points or delivery points in accordance with embodiments of the present disclosure.

One process for identifying paths to be traveled when performing one or more tasks, including but not limited to the fulfillment of an order for an item, and the delivery of the item to location is shown in FIG. 7. Referring to FIG. 7, a flow chart 700 representing one embodiment of a process for determining a routing point or a delivery point in accordance with embodiments of the present disclosure is shown.

At box 710, a set of routing and/or delivery points associated with a destination is established using defined location hypotheses for the destination. For example, referring again to FIGS. 6A through 6F, routing points or delivery points for a location may be defined based on location hypotheses that are defined using geolocations defined by traditional geocoders, augmented and updated by geoscans within a vicinity of the location. At box 720, an order including a request to deliver an item to the destination is received. The order may be placed online, e.g., via one or more web sites 216 associated with the marketplace 210, or, alternatively, in person or over a telephone.

Upon receiving the order for the item, the process advances to boxes 730, 732, 734 in parallel, in which attributes of the order, the item or the destination are determined. Attributes of the order may include an identity of a customer who placed the order, a time or date at which the order was placed, any customized shipping instructions, or any other factors. Attributes of the item may include sizes, shapes, volumes, lengths, widths, heights, masses or weights, colors, model numbers, serial numbers, or any other factors. Attributes of the destination may include environmental conditions relating to the destination, any events taking place at or near the destination, or any other factors.

At box 740, one of the routing points is selected for the delivery of the item based at least in part on the attributes of the order, the item and/or the destination determined at boxes 730, 732, 734. At box 750, one of the delivery points is selected for the delivery of the item based at least in part on such attributes. The routing points or delivery points may be selected on any basis. For example, a ranking or priority of the set of points defined at box 710 may be determined based on the attributes, and a routing point and a delivery point may be selected from the set according to the ranking or priority.

At box 760, a path from an origin of the item, e.g., a fulfillment center or other facility where the item included in the order is stored, to the routing point selected at box 740 is defined. The path may contemplate or consider any type or mode of transit between the origin and the routing point, such as cars, trucks, trailers, freight cars, container ships or cargo aircraft (e.g., manned aircraft or unmanned aircraft, such as drones), and may be determined using the distances, times or costs of travel between the origin and the routing point or any intervening points according to one or more algorithms or formulas, such as Dijkstra's Algorithm or the Floyd-Warshall Algorithm. At box 770, a path from the routing point selected at box 740 and the delivery point selected at box 750 is determined. Because the routing point is typically located near or at the destination, and because the delivery point is typically located at the destination, the path may contemplate or consider specific temporal, weather, seasonal, legal or regulatory considerations at the location, e.g., times, days, months or seasons at which the item is to be delivered; precipitation, temperature, humidity or ground or snow cover at the destination; parking regulations or traffic conditions at the destination, or any other relevant factor. In some embodiments, the paths from the origin to the routing point, and from the routing point to the delivery point, may be defined simultaneously or in accordance with a common process.

At box 780, instructions to deliver the item from the origin to the selected routing point by vehicle are provided to a delivery associate. For example, such instructions may identify highways to be traveled by a car, a truck or a trailer, as well as a discrete location or set of locations at which the car, the truck or the trailer may be parked at the routing point. The instructions may further instruct the delivery associate to place the vehicle in a specific alignment or orientation at the routing point, e.g., parallel parking or backing into a space. At box 790, instructions to deliver the item from the selected routing point to the delivery point on foot are provided to a delivery associate, and the process ends. For example, such instructions may identify a specific point or region at a location where the item is to be delivered, e.g., with coordinates or distances and directions to be traveled in order to reach the specific point or region, or by reference to one or more existing landmarks or features associated with the specific point or region. The instructions may further identify any particular environmental conditions or events that may be expected in a vicinity of either the routing point or the delivery point, including but not limited to water, snow, sand or ice, a roaming pet, or traffic or construction, or surface features between the routing point and the delivery point such as pathways, stairways, hills, ramps, escalators or other features having variations in elevation and position.

Figure 8A:
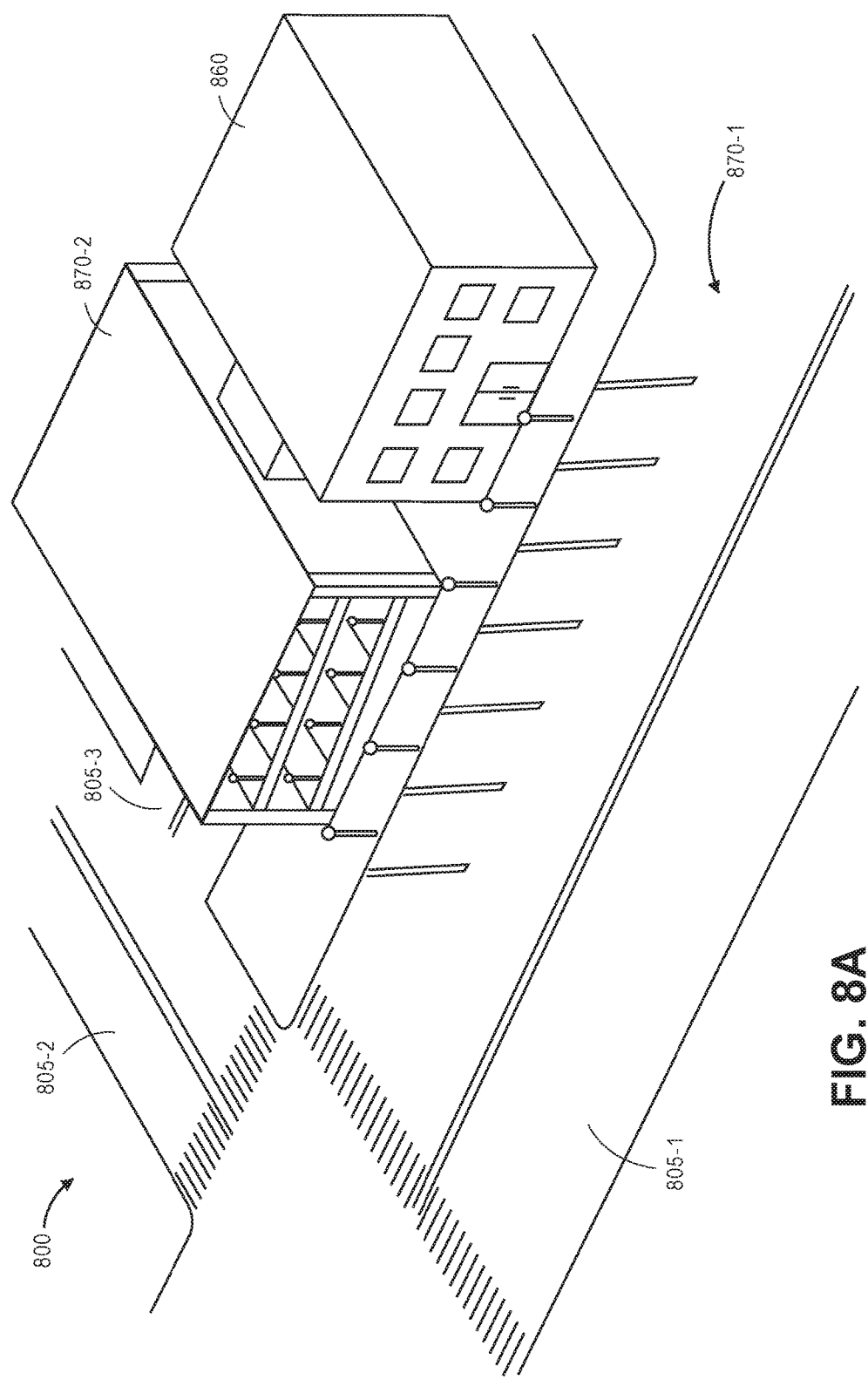
FIGS. 8A and 8B are views of aspects of one system for determining routing points or delivery points in accordance with embodiments of the present disclosure.
Figure 8B:
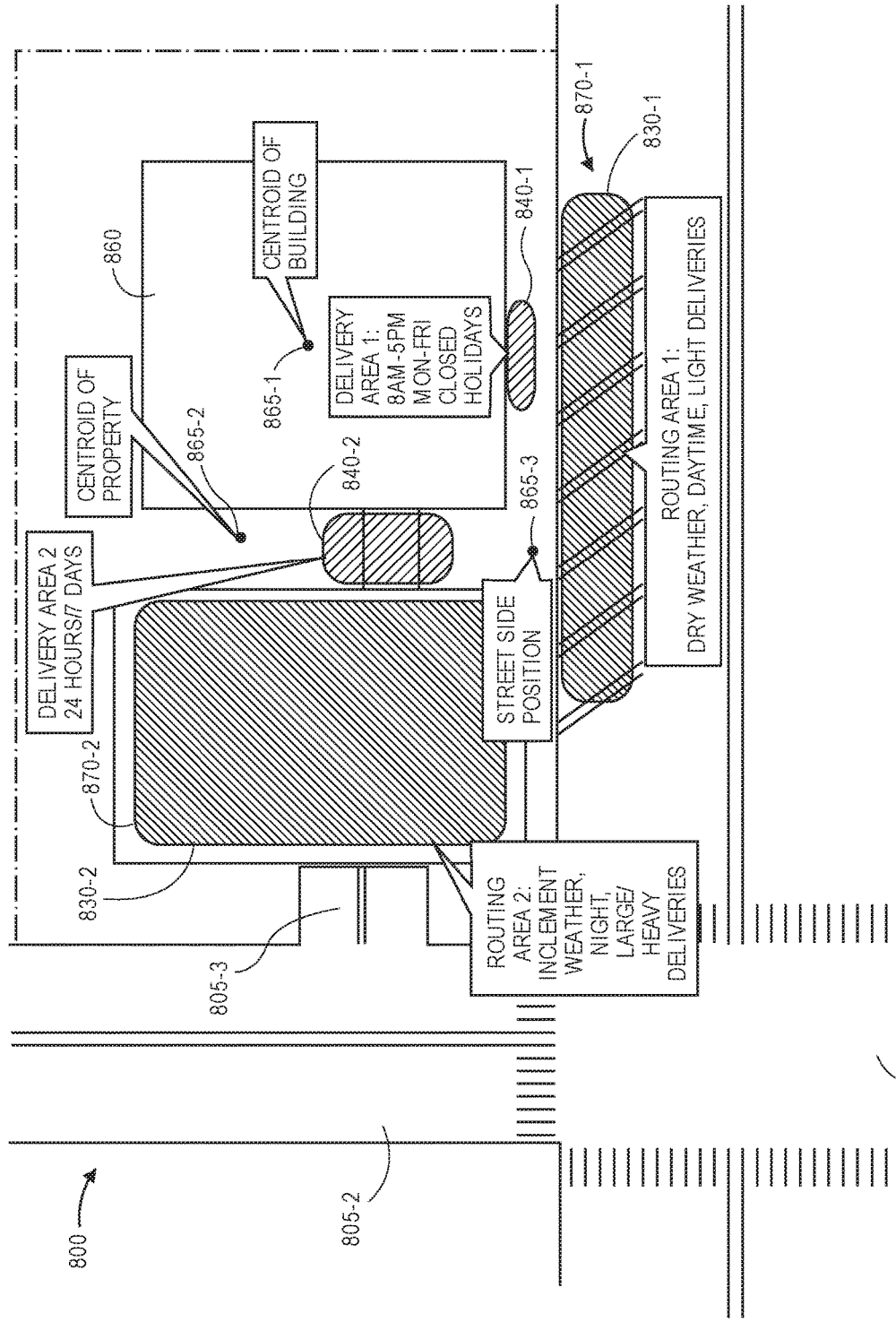

Referring to FIGS. 8A and 8B, views of aspects of one system 800 for determining routing points or delivery points in embodiments of the present disclosure are shown. Except where otherwise noted, reference numerals preceded by the number "8" in FIGS. 8A and 8B refer to elements that are similar to elements having reference numerals preceded by the number "6" in FIGS. 6A through 6F, by the number "4" in FIG. 4A, FIG. 4B or FIG. 4C, by the number "2" in FIG. 2A or FIG. 2B or by the number "1" shown in FIGS. 1A through 1E.

As is shown in FIG. 8A, the system 800 includes a location 860 at which a task is to be performed (e.g., a building to which an item is to be delivered) and parking facilities 870-1, 870-2 bounded by streets 805-1, 805-2. The parking facility 870-1 is a row of uncovered on-street parking spaces adjacent to the location 860 along the street 805-1. The parking facility 870-2 is a covered parking garage that is accessed from the street 805-2 via a driveway 805-3.

As is discussed above, some embodiments of the systems and methods of the present disclosure are directed to identifying points or regions in space that are associated with, or optimal or preferred for, the performance of a task, and directing one or more persons, vehicles or machines to perform the task in one or more of such points or regions. The points or regions in space may be determined, and selected, based at least in part on any attributes of the task or of the one or more persons, vehicles or machines. As is shown in FIG. 8B, a pair of routing areas 830-1, 830-2 and a pair of delivery areas 840-1, 840-2 that have been determined to be associated with the location 860, or optimal or preferred for the location 860, are shown. The delivery areas 840-1, 840-2 and the routing areas 830-1, 830-2 may have been identified based on coordinates determined during the prior performance of tasks at the location 860, or uncertainties regarding such coordinates, such as one or more geocodes defined following the scanning or other recognition of items previously delivered to the location 860. The delivery areas 840-1, 840-2 and the routing areas 830-1, 830-2 may be substantially different from a centroid 865-1 of a structure at the location 860, a centroid 865-2 of the property at the location 860 or a streetside position 865-3 of the location 860, which may be identified for the location 860 based on traditional geocoding techniques. By providing a person, a vehicle or a machine with one or more of the routing areas 830-1, 830-2 or the delivery areas 840-1, 840-2, tasks may be performed more precisely and efficiently than if the worker, the vehicle or the machine was provided with traditional geolocation information, such as the centroid 865-1, the centroid 865-2 or the streetside position 865-3.

In accordance with the present disclosure, the routing areas 830-1, 830-2 and the delivery areas 840-1, 840-2 may be deemed more optimal or preferred, or less optimal preferred, based on attributes of a task or of persons, vehicles or machines charged with performing the task, or on any other relevant factors, such as any relevant temporal, weather, seasonal, legal or regulatory considerations, or other considerations. For example, as is shown in FIG. 8B, the delivery area 840-1, which is located at a front door of the location 860, is open and accessible between the hours of 8 o'clock in the morning and 5 o'clock in the evening, on weekdays, but is closed on holidays. The delivery area 840-2, which is located between the parking facility 870-2 and a side door of the location 860, is open and accessible twenty-four hours per day, and seven days per week. Thus, when a task is to be performed during working hours on a weekday, either the delivery area 840-1 or the delivery area

840-2 may be accessed by a person, a vehicle or machine when performing the task, and one of the delivery area 840-1 or the delivery area 840-2 may be selected on any other basis or based on any attributes or factors other than a time of day or a day of a week.

Similarly, as is also shown in FIG. 8B, the routing area 830-1, which is not covered and is located within the parking facility 870-1 adjacent to the front door of the location 860, is preferred during dry weather or daytime hours, or when delivering lightweight items to the location 860. The routing area 830-2, which is located adjacent to the location and may be accessed via the driveway 805-3, is associated with the covered parking facility 870-2, and is preferred during inclement weather, at night, or when large or heavy items are to be delivered to the location 860.

In accordance with the present disclosure, a person, a vehicle or a machine charged with performing a task at the location 860 may be provided with information regarding a path from an origin first to one of the routing areas 830-1, 830-2 and next to one of the delivery areas 840-1, 840-2 at the location 860. For example, when weather conditions are sunny or otherwise favorable during daylight, or when small items are to be delivered to the location 860, a person, a vehicle or a machine may thus be instructed to proceed with the items first to the routing area 830-1, and then to one of the delivery areas 840-1, 840-2. When weather conditions are cloudy, rainy or snowy, or otherwise unfavorable, when a large or heavy item is to be delivered to the location 860, the worker, the vehicle or the machine may be instructed to proceed with the item first to the routing area 830-2, and then to one of the delivery areas 840-1, 840-2.

Likewise, during working hours, a person, a vehicle or a machine may be instructed to proceed first to one of the routing areas 830-1, 830-2, and then to either the delivery area 840-1 or the delivery area 840-2. Outside of working hours (e.g., before 8 o'clock in the morning, after 5 o'clock in the evening, or on weekends or holidays), the worker, the vehicle or the machine may be instructed to proceed to one of the routing area 830-1 or the routing area 830-2, depending on the time of day, the prevailing weather conditions, or the size of one or more items that is intended for delivery, but must then be instructed to proceed to the delivery area 840-2, and not to the delivery area 840-1, which is closed at such times. An optimal path for proceeding from an origin to one of the routing area 830-1 or the routing area 830-2, and then to one of the delivery area 840-1 or the delivery area 840-2, may be identified according to one or more algorithms or formulas, such as Dijkstra's Algorithm or the Floyd-Warshall Algorithm, and provided to the worker, the vehicle or the machine in any manner (e.g., to a handheld device of the worker, or to one or more computer devices associated with the vehicle or the machine, via wired or wireless means).

Points or regions in space at which a task may be optimally or preferably performed by a person, a vehicle or a machine may be identified based on any attributes of the task, or of the person, the vehicle or the machine, and for any type or form of task. For example, where traditional geocoding techniques broadly identify geocodes for an undefined location such as a park, a venue, a field, a neighborhood or a body of water in general terms, such as with regard to a centroid of the location, such points or regions may be identified and provided to a person, a vehicle or a machine to aid in the performance of one or more tasks at the location. The systems and methods of the present disclosure may be used in the performance of any task and, therefore, are not limited for use in connection with the delivery of items.

Figure 9:
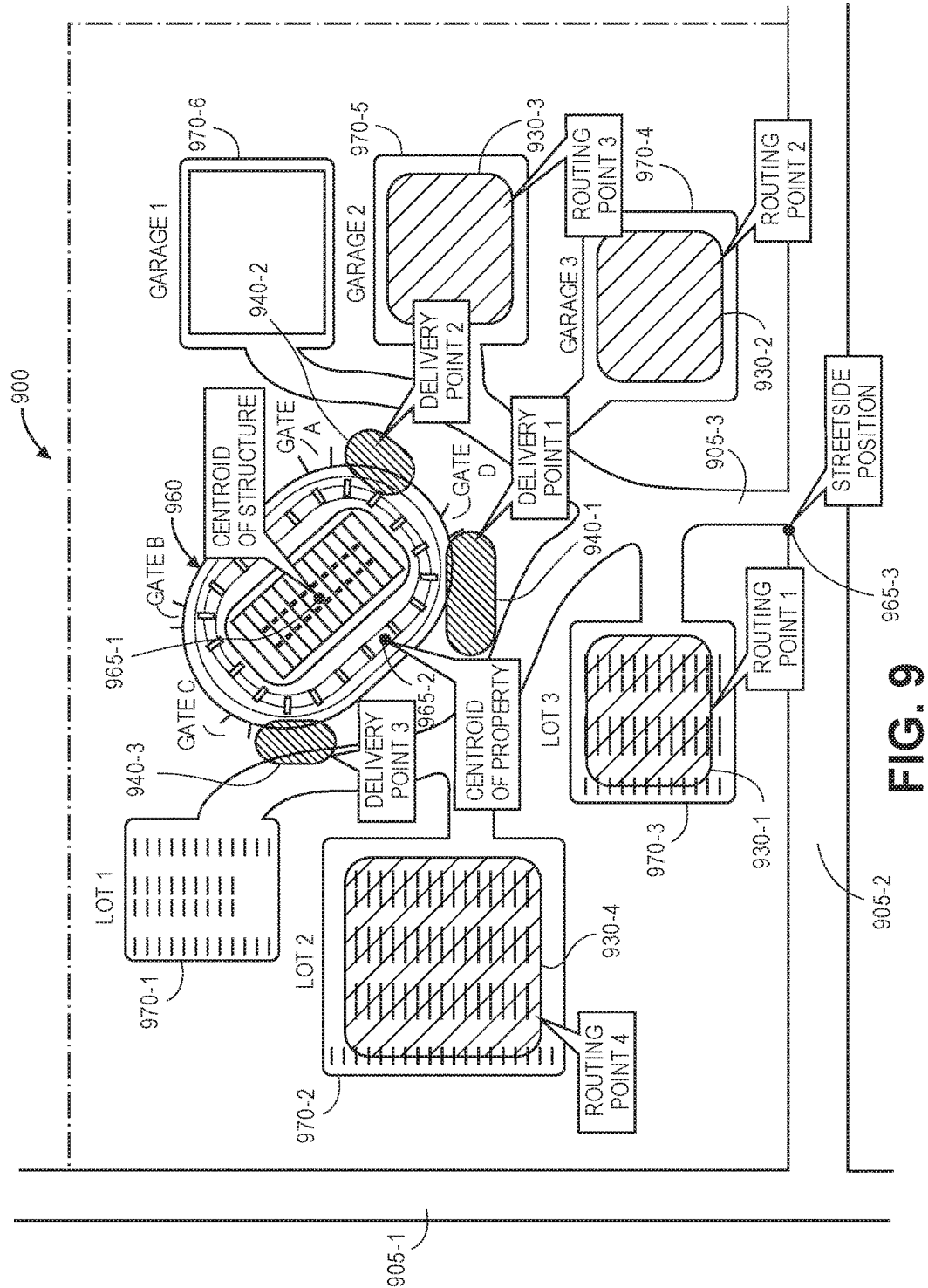
FIG. 9 is a view of aspects of one system for determining routing points or delivery points in accordance with embodiments of the present disclosure.

Referring to FIG. 9, views of aspects of one system 900 for determining routing points or delivery points in accordance with embodiments of the present disclosure are shown. Except where otherwise noted, reference numerals preceded by the number "9" in FIG. 9 refer to elements that are similar to elements having reference numerals preceded by the number "8" in FIGS. 8A and 8B, by the number "6" in FIGS. 6A through 6F, by the number "4" in FIG. 4A, FIG. 4B or FIG. 4C, by the number "2" in FIG. 2A or FIG. 2B or by the number "1" shown in FIGS. 1A through 1E.

As is shown in FIG. 9, the system 900 includes a stadium 960 having a plurality of parking facilities including lots 970-1, 970-2, 970-3 and garages 970-4, 970-5, 970-6 that are bounded by streets 905-1, 905-2. The stadium 960 may be accessed at one of four gates, viz., Gate A, Gate B, Gate C and Gate D. In accordance with traditional geocoding techniques, a fan, a patron or another person who holds tickets to an event to be held at the stadium 960 and is unsure how to most efficiently travel to the stadium 960 may generally determine a location of the stadium 960 by providing an alphanumeric identifier of the stadium 960 (e.g., a name of the stadium 960, or a street address of the stadium 960) to a geocoder as an input. The fan, the patron or the other person may receive an output from the geocoder that locates the stadium 960 with geocodes corresponding to a centroid 965-1 of the stadium 960, a centroid 965-2 of a property on which the stadium 960 is constructed, or a streetside position 965-3. Such geocodes may be unhelpful, however, where the fan, the patron or the other person is unfamiliar with the stadium 960, where there are many routing or travel options available at the stadium 960, or where hundreds or thousands of other fans, patrons or persons are also attending the event at the stadium 960.

In accordance with the present disclosure, optimal or preferred routing points 930-1, 930-2, 930-3, 930-4 corresponding to specific parking facilities and optimal or preferred delivery points 940-1, 940-2, 940-3 corresponding to specific ingress or egress points that are most conveniently located with respect to the seats for which the fan, the patron or the other person holds tickets to the event at the stadium 960 may be identified based on scans or check-ins of other fans, patrons or persons who held similarly located seats to other events previously held at the stadium 960. For example, where seats are located in a specific section of the stadium 960, ingress or egress points, e.g., gates, that are located most closely or conveniently to that section may be ranked on any basis, including distance to that section, numbers of turnstiles or security personnel, or any other factor. As is shown in FIG. 9, Gate D is identified as the most optimal delivery point 940-1, followed by Gate A and Gate C as the next most optimal delivery points 940-2, 940-3. Likewise, parking facilities located most closely or conveniently to that section or to one or more of the delivery points 940-1, 940-2, 940-3 may be ranked on any basis, including weather conditions on a date or time of a given event at the stadium 960, available capacity within such parking facilities, or any other factor. As is shown in FIG. 9, the parking lot 970-3 is identified as the most optimal routing point 930-1, followed by the parking garage 970-4, the parking garage 970-5 and the parking lot 970-2, as the next most optimal routing points, viz., routing points 930-2, 930-3, 930-4.

Therefore, in accordance with embodiments of the present disclosure, a fan, a patron or another person attending an event at the stadium 960 may be provided with an optimal path from his or her origin to his or her seats within the stadium 960. The optimal path may be determined based not on general geocodes such as the centroid 965-1, the centroid 965-2 or the streetside position 965-3, but on specifically tailored information regarding the fan, the patron or the other person, as well as the stadium 960 or the event to be held there, and any prevailing temporal, weather, seasonal, legal or regulatory considerations. The optimal path may include a routing point to which the fan, the patron or the other person may travel from the origin in a vehicle, such as a car, a truck or a bus, and a delivery point to which the fan, the patron or the other person may travel from the routing point in order to most efficiently arrive at his or her seats within the stadium 960 prior to the event.

The systems and methods of the present disclosure may be used to enhance the performance of any task at a given location, e.g., delivering one or more products to the location or providing one or more services at the location, by leveraging known information regarding the location and statistical data obtained during the performance of tasks at the location to identify most appropriate points or regions in space where such tasks should be performed at the location. For example, because a plurality of geoscans obtained in connection with a given location may be randomized or adversely affected based on behavior of a person, a vehicle or a machine performing the task, such geoscans may be clustered into hypotheses that may correspond to physical features at the location such as a doorstep, a parked vehicle, a nearby parking lot or a delivery location.

Moreover, when a new geoscan is obtained, and is determined to match or correspond to a previously defined location hypothesis, the new geoscan may be iteratively added to the previously defined location hypothesis, thereby reducing the uncertainty or tolerance for the location hypothesis. If the new geoscan does not match or correspond to an existing location hypothesis, however, the new geoscan may stand as a basis for defining a new location hypothesis.

Furthermore, in addition to instructing persons, vehicles or machines as to where to go when performing a task, e.g., the points or regions in space that are most appropriate for the performance of the task, the systems and methods of the present disclosure may further instruct such persons, vehicles or machines as to where not to go when performing the task. For example, where such points or regions in space are identified, a geofence may be defined based on such points or regions in space, as corresponding to locations that are not preferred or optimal for the performance of the task. Persons, vehicles or machines may be instructed to avoid such locations, or virtual boundaries around such locations, when performing tasks in the future.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, as used herein, the terms "point" or "points" and "region" or "regions," or like terms (e.g., areas or sectors), may be assumed to interchangeably refer to points or regions in space that may be identified according to one or more of the systems or methods of the present disclosure unless otherwise expressly noted herein. Those of ordinary skill in the pertinent arts will recognize that a "delivery point" or a "routing point" or any other point in space associated with the performance of a task may be a single "point" in space, or a region in space, defined according to one or more of the systems or methods disclosed herein.

Moreover, although some of embodiments disclosed herein show identify two-dimensional points or regions in space that are determined to be associated with, optimal or preferred for travel to a given location, those of ordinary skill in the pertinent arts will recognize that three-dimensional volumes in space corresponding to not only specific coordinates but also specific heights or altitudes may also be defined in accordance with the present disclosure. Furthermore, although some of the embodiments of the present disclosure reference the use of standard ground-based vehicles (e.g., cars, trucks or bicycles) to travel to such points or regions in space, the systems and methods of the present disclosure are also not so limited, and may be utilized on water or in the air (e.g., by container ships or cargo aircraft), or by non-standard vehicles or machines (e.g., autonomous mobile robots) operating on land, in the air or at sea.

Furthermore, the identification of geocodes or geolocations from which a geoscan or a location hypothesis may be defined are not limited to GPS-based systems. For example, coordinates of a position may be determined using cellular telephone equipment configured to estimate (e.g., triangulate) a position from one or more cellular telephone network towers or other network sources, and a geoscan may be defined based on such coordinates and uncertainties with the cellular telephone equipment, towers or network sources. Likewise, coordinates of a position may be determined using one or more accelerometers, e.g., by integrating an acceleration function to determine a velocity function, and integrating the velocity function to determine an absolute or relative position in a single dimension, or in multiple dimensions, e.g., along one or more of the x-, y- and z-axes. Likewise, a position function for the mobile computer device may be derived by integrating the velocity function in a single dimension or in multiple dimensions.

Moreover, although some of the embodiments disclosed herein reference the use of handheld computer device by one or more human users, e.g., to scan a bar code or other marked identifier provided on an outer surface of an item, the systems and methods of the present disclosure are not so limited. For example, the systems and methods disclosed herein may be provided in connection with the operation of one or more vehicles and used to estimate or confirm positions of such vehicles based on data obtained from one or more sensors.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A delivery system comprising:
   a plurality of unmanned aerial vehicles, wherein the plurality of unmanned aerial vehicles comprises a first unmanned aerial vehicle and a second unmanned aerial vehicle;
   at least one memory component; and
   at least one computer processor,
   wherein the at least one computer processor is configured to at least:
      receive, from the first unmanned aerial vehicle, a first set of coordinates of the first unmanned aerial vehicle during a first delivery of at least a first item to a location at a first time;
      identify a geolocation corresponding to the location;
      determine a first level of uncertainty associated with at least one of the first unmanned aerial vehicle at the first time or the first set of coordinates;
      determine a first geoscan comprising a first Gaussian distribution having a first mean location at the first set of coordinates and the first level of uncertainty;
      define a first region at the location based at least in part on the first geoscan and the geolocation, wherein the first region comprises a second Gaussian distribution having the first mean location at the first set of coordinates and the first level of uncertainty;
      store information regarding the first region in at least one data store;
      receive a request for a second delivery of at least a second item to the location;
      identify at least one attribute of at least one of the second delivery or the second item based at least in part on the request;
      determine that the first region is suitable for the second delivery based at least in part on the at least one attribute;
      determine a path from an origin to the first region; and
      transmit, to a second unmanned aerial vehicle, an instruction to deliver at least the second item from the origin to the first region along the path.

2. The delivery system of claim 1, wherein the at least one computer processor is further configured to at least:
   receive, from the second unmanned aerial vehicle, a second set of coordinates of the second unmanned aerial vehicle during the second delivery at a second time;
   determine a second level of uncertainty associated with at least one of the second unmanned aerial vehicle at the second time or the second set of coordinates;
   define a second geoscan comprising a third Gaussian distribution centered at the second set of coordinates and having the second level of uncertainty;
   determine that the second geoscan corresponds to the first region;
   modify the second Gaussian distribution based at least in part on the second geoscan; and
   update the information regarding the first region in the at least one data store based at least in part on the modified second Gaussian distribution.

3. The delivery system of claim 1, wherein the at least one computer processor is further configured to at least:
   receive, from the second unmanned aerial vehicle, a second set of coordinates of the second unmanned aerial vehicle during the second delivery at a second time;

determine a second level of uncertainty associated with at least one of the second unmanned aerial vehicle at the second time or the second set of coordinates;

define a second geoscan comprising a third Gaussian distribution having a second mean location at the second set of coordinates and the second level of uncertainty;

determine that the second geoscan does not correspond to the first region;

in response to determining that the second geoscan does not correspond to the first region, define a second region at the location based at least in part on the second geoscan and the geolocation, wherein the second region comprises a fourth Gaussian distribution having the second mean location and the second level of uncertainty; and store information regarding the second region in the at least one data store.

4. The delivery system of claim 1, wherein the first set of coordinates are defined in three-dimensions, and wherein the first set of coordinates comprise a latitude and a longitude for the first mean location and an altitude at the first mean location.

5. A method comprising:

after a first delivery of at least a first item to a location, identifying a first sensed position associated with the first delivery using at least one computer processor;

determining a first level of uncertainty associated with at least the first sensed position using the at least one computer processor;

defining a first vector based at least in part on the first sensed position and the first level of uncertainty using the at least one computer processor;

determining a first geolocation associated with the location;

establishing a first preferred area for landing unmanned aerial vehicles at the location based at least in part on the first vector and the first geolocation using the at least one computer processor; and storing information regarding the first preferred area in association with the location in at least one data store, wherein the information regarding the first preferred area comprises a first probability distribution function for the first preferred area.

6. The method of claim 5, further comprising:

receiving a request for a second delivery of a second item to the location;

determining information regarding at least one of the second delivery, the second item or the location;

selecting the first preferred area based at least in part on the information regarding the at least one of the second delivery, the second item or the location using the at least one computer processor; and transmitting information comprising a first instruction to proceed to the first preferred area to a first unmanned aerial vehicle over a network.

7. The method of claim 6, further comprising:

identifying an origin of the second item using the at least one computer processor; and determining an optimal path from the origin to the first preferred area using the at least one computer processor, wherein the first instruction to proceed to the first preferred area identifies at least a portion of the optimal path.

8. The method of claim 6, further comprising:

receiving, from the first unmanned aerial vehicle over the network, a second sensed position associated with the request for the second delivery of the second item to the location;

determining a second level of uncertainty associated with the second sensed position;

defining a second vector based at least in part on the second sensed position and the second level of uncertainty using the at least one computer processor;

determining whether the second vector corresponds to the first preferred area for the location using the at least one computer processor;

in response to determining that the second vector corresponds to the first preferred area, modifying the first probability distribution function of the first preferred area based at least in part on the second vector; and updating the information regarding the first preferred area in association with the location in the at least one data store, wherein the updated information regarding the first preferred area comprises the modified first probability distribution function.

9. The method of claim 8, wherein the first probability distribution function for the first preferred area comprises a mean location for the first preferred area, at least one measure of uncertainty of the mean location, and an angle of orientation of the first preferred area, and wherein modifying the first probability distribution function of the first preferred area based at least in part on the second vector further comprises:

generating a covariance matrix for the second vector using the at least one computer processor;

generating a covariance matrix for the first probability distribution function for the first preferred area using the at least one computer processor;

determining a first product of the covariance matrix for the second vector and the covariance matrix for the first probability distribution function; and modifying at least one of the mean location for the first preferred area, the at least one measure of uncertainty or the angle of orientation based at least in part on the first product.

10. The method of claim 9, wherein the first preferred area is one of a plurality of preferred areas for the location, wherein generating a covariance matrix for the first probability distribution function for the first preferred area further comprises:

generating a plurality of covariance matrices, wherein each of the plurality of covariance matrices is generated for a respective one of a plurality of probability distribution functions for one of the plurality of preferred areas, and wherein the first probability distribution function is one of the plurality of probability distribution functions, wherein determining the first product of the covariance matrix for the second vector and the covariance matrix for the first probability distribution function further comprises:

determining products of the covariance matrix for the second vector and each of the plurality of covariance matrices, wherein the first product is one of the products, and wherein the method further comprises:

identifying one of the products of the covariance matrix corresponding to a reduction in a measure of uncertainty of a mean location of one of the plurality of preferred areas, wherein the first preferred area is the one of the plurality of preferred areas.

11. The method of claim 6, further comprising:
receiving, from the first unmanned aerial vehicle over the network, a second sensed position associated with the request for the second delivery of the second item to the location;
determining a second level of uncertainty associated with the second sensed position;
defining a second vector based at least in part on the second sensed position and the second level of uncertainty using the at least one computer processor;
determining whether the second vector corresponds to the first preferred area for the location using the at least one computer processor;
in response to determining that the second vector does not correspond to the first preferred area,
establishing a second preferred area for the location based at least in part on the second vector and the first geolocation using the at least one computer processor; and
storing information regarding the second preferred area in association with the location in at least one data store,
wherein the information regarding the second preferred area comprises a second probability distribution function for the second preferred area.

12. The method of claim 11, further comprising:
determining at least one consideration associated with the second delivery, wherein the at least one consideration is at least one of:
a date of the second delivery;
a time of the second delivery;
a season of the second delivery;
a prevailing weather condition during the second delivery;
a legal restriction in effect during the second delivery; and
a regulatory restriction in effect during the second delivery,
wherein the information regarding the second preferred area comprises an association between the second preferred area and the at least one consideration.

13. The method of claim 6, further comprising:
receiving, from the first unmanned aerial vehicle over the network, a second sensed position associated with the request for the second delivery of the second item to the location;
determining a second level of uncertainty associated with the second sensed position;
defining a second vector based at least in part on the second sensed position and the second level of uncertainty using the at least one computer processor;
determining whether the second vector corresponds to the first preferred area for the location using the at least one computer processor;
in response to determining that the second vector does not correspond to the first preferred area,
disregarding the second sensed position as an outlier with respect to the first preferred area.

14. The method of claim 6, further comprising:
determining information regarding at least a portion of a surface of the first preferred area, wherein the information comprises at least one latitude, at least one longitude and at least one altitude of the surface,
wherein the information comprising the first instruction further comprises the information regarding at least the portion of the surface of the first preferred area.

15. The method of claim 14, wherein determining the information regarding at least the portion of the surface of the preferred area comprises:
identifying at least one surface feature associated with the first preferred area; and
determining that the first preferred area comprises a delivery point for the second delivery based at least in part on the at least one surface feature; and
wherein the information comprising the first instruction further comprises a second instruction to deposit the second item at the delivery point, and
wherein the at least one surface feature comprises at least one of a portion of a ramp; a curb; a road; a driveway; a walkway; a sloped surface; or a substantially flat surface.

16. The method of claim 5, wherein identifying the first sensed position associated with the first delivery comprises:
receiving information regarding the first sensed position over a network, wherein the information is received from at least one of:
a handheld device;
a ground-based vehicle; or
an aerial vehicle, and
wherein the first sensed position comprises a latitude, a longitude and an altitude associated with the location.

17. The method of claim 5, wherein identifying the first sensed position associated with the first delivery comprises:
identifying a plurality of sensed positions associated with prior deliveries of items to the location using the at least one computer processor, wherein the first sensed position is one of the plurality of sensed positions, and wherein the first delivery is one of the plurality of prior deliveries; and
determining levels of uncertainty associated with at least some of the sensed positions using the at least one computer processor, wherein the vector is defined based at least in part on the at least some of the sensed positions and the levels of uncertainty.

18. A computer-implemented method comprising:
receiving a first geoscan from a first unmanned aerial vehicle over a network, wherein the first geoscan is received from the first unmanned aerial vehicle during a first delivery of at least a first item to a location by the first unmanned aerial vehicle;
defining a location hypothesis by at least one computer processor, wherein the location hypothesis is defined based at least in part on the first geoscan, and wherein the location hypothesis comprises a mean location, a major axis and a minor axis;
receiving a request for a second delivery of at least a second item to the location over the network;
transmitting information regarding the second delivery to a second unmanned aerial vehicle over the network, wherein the information regarding the second delivery comprises at least a first instruction to travel to the location with the second item and a second instruction to deposit the second item on a surface within the location hypothesis;
receiving a second geoscan from the second unmanned aerial vehicle over the network, wherein the second geoscan is received from the second unmanned aerial vehicle during the second delivery; and refining the location hypothesis by the at least one computer processor, wherein the location hypothesis is refined based at least in part on the second geoscan,
wherein refining the location hypothesis comprises at least one of:
  relocating the mean location;
  modifying the major axis; or
  modifying the minor axis.

19. The computer-implemented method of claim 18, wherein the first geoscan is received from a first position sensor associated with the first unmanned aerial vehicle,
  wherein defining the location hypothesis comprises:
    determining a first level of uncertainty associated with the first position sensor or the first geoscan; and
    selecting at least one of the major axis or the minor axis based at least in part on the first level of uncertainty,
  wherein the second geoscan is received from a second position sensor associated with the second unmanned aerial vehicle, and
  wherein refining the location hypothesis comprises:
    determining a second level of uncertainty associated with the second position sensor or the second geoscan; and
    modifying at least one of the major axis or the minor axis based at least in part on the second level of uncertainty.

20. The computer-implemented method of claim 18, wherein receiving the first geoscan from the first unmanned aerial vehicles over the network comprises:
  receiving geoscans from each of a plurality of unmanned aerial vehicles over the network, wherein the geoscans are received from the plurality of unmanned aerial vehicles during deliveries of at least one item to the location by the plurality of unmanned aerial vehicles;
  defining a cluster of at least some of the geoscans, and wherein defining the location hypothesis comprises:
    selecting at least one of the mean location, the major axis or the minor axis based at least in part on the cluster of the at least some of the geoscans.

\* \* \* \* \*